(12) United States Patent
Abu Qahouq

(10) Patent No.: US 12,510,603 B2
(45) Date of Patent: Dec. 30, 2025

(54) DETERMINING STATE-OF-HEALTH OF AN ENERGY STORAGE DEVICE USING COMPLEX IMPEDANCE SPECTRUM

(71) Applicant: THE BOARD OF TRUSTEES OF THE UNIVERSITY OF ALABAMA, Tuscaloosa, AL (US)

(72) Inventor: Jaber A. Abu Qahouq, Tuscaloosa, AL (US)

(73) Assignee: THE BOARD OF TRUSTEES OF THE UNIVERSITY OF ALABAMA, Tuscaloosa, AL (US)

(*) Notice: Subject to any disclaimer, the term of this patent is extended or adjusted under 35 U.S.C. 154(b) by 213 days.

(21) Appl. No.: 18/556,769

(22) PCT Filed: Feb. 28, 2022

(86) PCT No.: PCT/US2022/018094
§ 371 (c)(1),
(2) Date: Oct. 23, 2023

(87) PCT Pub. No.: WO2022/231695
PCT Pub. Date: Nov. 3, 2022

(65) Prior Publication Data
US 2024/0201280 A1 Jun. 20, 2024

Related U.S. Application Data

(60) Provisional application No. 63/181,430, filed on Apr. 29, 2021.

(51) Int. Cl.
*G01R 31/392* (2019.01)
*G01R 31/389* (2019.01)

(52) U.S. Cl.
CPC ......... *G01R 31/392* (2019.01); *G01R 31/389* (2019.01)

(58) Field of Classification Search
None
See application file for complete search history.

(56) References Cited

U.S. PATENT DOCUMENTS

| | | | |
|---|---|---|---|
| 7,019,542 B2 | 3/2006 | Tinnemeyer | |
| 7,554,294 B2 | 6/2009 | Srinivasan et al. | |
| 8,860,420 B2 | 10/2014 | Rich et al. | |
| 2005/0218915 A1 | 10/2005 | Tinnemeyer | |

(Continued)

FOREIGN PATENT DOCUMENTS

CN 112611973 A 4/2021

OTHER PUBLICATIONS

Extended European Search Report received in corresponding European Application No. 22796320.4, mailed Feb. 10, 2025.

(Continued)

*Primary Examiner* — Jas A Sanghera
(74) *Attorney, Agent, or Firm* — Meunier Carlin & Curfman LLC

(57) ABSTRACT

Systems and method for determining State-of-Health (SOH) for energy storage devices are described herein. An example method includes measuring a complex impedance of an energy storage device for a range of frequency, and estimating a state of health (SOH) of the energy storage device based on an interrelationship between a magnitude and a phase of the complex impedance of the energy storage device.

15 Claims, 20 Drawing Sheets

(56) References Cited

U.S. PATENT DOCUMENTS

| | | | | |
|---|---|---|---|---|
| 2013/0271148 | A1* | 10/2013 | Maeda | G01R 31/392 |
| | | | | 324/426 |
| 2016/0245875 | A1 | 8/2016 | Kircheva et al. | |
| 2017/0219660 | A1 | 8/2017 | Christensen et al. | |
| 2018/0080995 | A1 | 3/2018 | Heinen | |
| 2018/0143257 | A1* | 5/2018 | Garcia | G01R 31/382 |
| 2018/0156872 | A1 | 6/2018 | Oguma et al. | |
| 2020/0014220 | A1 | 1/2020 | Srinivasan et al. | |
| 2020/0164763 | A1* | 5/2020 | Holme | B60L 58/16 |
| 2021/0004879 | A1* | 1/2021 | Nakajima | G06Q 30/0283 |
| 2022/0120817 | A1* | 4/2022 | Okada | H01M 10/48 |
| 2024/0036115 | A1* | 2/2024 | Park | H01M 10/4285 |

OTHER PUBLICATIONS

Lyu Chao et al., "Research on the Performance Evaluation of Lithium-ion Battery Cascade Utilization Based on Impedance Spectrum", 2020 15TH IEEE Conference on Industrial Electronics and Applications, IEEE, Nov. 9, 2020 (Nov. 9, 2020), pp. 1714-1719.

International Search Report and Written Opinion received in PCT/US2022/018094 mailed Jun. 21, 2022.

Abdulkarim, M., Shafie, A., Ahmad, W. F. W., & Razali, R. (2014). "Performance comparison between MLP neural network and exponential curve fitting on airwaves data." In Advances in Computer Science and its Applications: CSA 2013 (pp. 1079-1087).

Abu Qahouq, Jaber A., and Zhiyong Xia. "Single-perturbation-cycle online battery impedance spectrum measurement method with closed-loop control of power converter." IEEE transactions on industrial electronics 64.9 (2017): 7019-7029.

Anysz, Hubert, Artur Zbiciak, and Nabi Ibadov. "The influence of input data standardization method on prediction accuracy of artificial neural networks." Procedia Engineering 153 (2016): 66-70.

Bako, Zeinabou Nouhou, et al. "Experiment-based methodology of kinetic battery modeling for energy storage." IEEE Transactions on Industry Applications 55.1 (2018): 593-599.

Bazargan, Damon, Shaahin Filizadeh, and Ani M. Gole. "Stability analysis of converter-connected battery energy storage systems in the grid." IEEE Transactions on Sustainable energy 5.4 (2014): 1204-1212.

Cao et al., "Evaluation of paralleled battery system with SOC balancing and battery impedance magnitude measurement," 2018 IEEE Applied Power Electronics Conference and Exposition (APEC), 2018, pp. 437-441.

Cao, Xin, et al. "Multilayer modular balancing strategy for individual cells in a battery pack." IEEE Transactions on Energy Conversion 33.2 (2017): 526-536.

Chauhan, Priyesh J., et al. "Battery energy storage for seamless transitions of wind generator in standalone microgrid." IEEE Transactions on Industry Applications 55.1 (2018): 69-77.

Chowdhury, Sifat M., et al. "A novel battery management system using the duality of the adaptive droop control theory." IEEE Transactions on Industry Applications 55.5 (2019): 5078-5088.

Ge, Baoming, et al. "State-of-charge balancing control for a battery-energy-stored quasi-Z-source cascaded-multilevel-inverter-based photovoltaic power system." IEEE Transactions on Industrial Electronics 65.3 (2017): 2268-2279.

Guha, Arijit, and Amit Patra. "State of health estimation of lithium-ion batteries using capacity fade and internal resistance growth models." IEEE Transactions on Transportation Electrification 4.1 (2017): 135-146.

Huang, Wangxin, and Jaber A. Abu Qahouq. "An online battery impedance measurement method using DC-DC power converter control." IEEE Transactions on Industrial Electronics 61.11 (2014): 5987-5995.

Huang, Wangxin, and Jaber A. Abu Qahouq. "Energy sharing control scheme for state-of-charge balancing of distributed battery energy storage system." IEEE Transactions on Industrial Electronics 62.5 (2014): 2764-2776.

Huet, F. "A review of impedance measurements for determination of the state-of-charge or state-of-health of secondary batteries." Journal of power sources 70.1 (1998): 59-69.

Kim, Jungsoo, et al. "Data-driven state of health estimation of li-ion batteries with RPT-reduced experimental data." Ieee Access 7 (2019): 106987-106997.

Kim, Taesic, et al. "An on-board model-based condition monitoring for lithium-ion batteries." IEEE Transactions on Industry Applications 55.2 (2018): 1835-1843.

Lee, Kyung-min, et al. "Active cell balancing of li-ion batteries using $ LC $ series resonant circuit." IEEE Transactions on Industrial Electronics 62.9 (2015): 5491-5501.

Lei, Jing. "Cross-validation with confidence." Journal of the American Statistical Association 115.532 (2020): 1978-1997.

Li, Nan, et al. "SOH balancing control method for the MMC battery energy storage system." IEEE Transactions on Industrial Electronics 65.8 (2017): 6581-6591.

Li, Siqi, Chunting Chris Mi, and Mengyang Zhang. "A high-efficiency active battery-balancing circuit using multiwinding transformer." IEEE Transactions on Industry Applications 49.1 (2012): 198-207.

Lipu, Molla S. Hossain, et al. "Extreme learning machine model for state-of-charge estimation of lithium-ion battery using gravitational search algorithm." IEEE Transactions on Industry Applications 55.4 (2019): 4225-4234.

Maharjan, Laxman, et al. "State-of-charge (SOC)-balancing control of a battery energy storage system based on a cascade PWM converter." IEEE Transactions on Power Electronics 24.6 (2009): 1628-1636.

Mese, Murat, and Palghat P. Vaidyanathan. "Look-up table (LUT) method for inverse halftoning." IEEE Transactions on Image Processing 10.10 (2001): 1566-1578.

Mukkamala, Mahesh Chandra, and Matthias Hein. "Variants of rmsprop and adagrad with logarithmic regret bounds." International conference on machine learning. PMLR, 2017, pp. 2545-2553.

Nair, Vinod, and Geoffrey E. Hinton. "Rectified linear units improve restricted boltzmann machines." In Proceedings of the 27th international conference on machine learning (ICML-10), pp. 807-814. 2010.

Pinto, Claudio, et al. "Evaluation of advanced control for li-ion battery balancing systems using convex optimization." IEEE Transactions on Sustainable Energy 7.4 (2016): 1703-1717.

Qi et al., "Review of battery cell balancing techniques," in Proc. Australas. Universities Power Eng. Conf., Sep. 2014, pp. 1-6.

Rallabandi, Vandana, et al. "Incorporating battery energy storage systems into multi-MW grid connected PV systems." IEEE Transactions on Industry Applications 55.1 (2018): 638-647.

Shang, Yunlong, et al. "An integrated heater equalizer for lithium-ion batteries of electric vehicles." IEEE transactions on industrial electronics 66.6 (2018): 4398-4405.

Zhu et al., "A new lithium-ion battery internal temperature on-line estimate method based on electrochemical impedance spectroscopy measurement," Journal of Power Sources, Jan. 2015, vol. 274, pp. 990-1004.

Tenergy Corp., Cylindric Lithium-Ion Cell 30005-0, Datasheet of Tenergy. 2010. [Online]. Available: https://www.shorepowerinc.com/media/wysiwyg/files/Tenergy-30005-0-datasheet.pdf, 12 pages.

Texas Instruments Inc., Datasheet of TMS320F28335 Microcontroller. Accessed Dec. 24, 2019. [Online]. Available: https://www.ti.com/product/TMS320F28335. 215 pages.

Texas Instruments Inc., Datasheet of TMS320x2833x, 2823x Serial Communications Interface (SCI).Accessed Dec. 24, 2019. [Online]. Available: http://www.ti.com/lit/ug/sprufz5a/sprufz5a.pdf, 868 pages.

Texas Instruments Inc., TMS320F28335 Ordering & Quality. [Online]. Accessed Jul. 18, 2020, Available: https://www.ti.com/product/TMS320F28335#order-quality.

Waag, Wladislaw, Stefan Käbitz, and Dirk Uwe Sauer. "Experimental investigation of the lithium-ion battery impedance characteristic at various conditions and aging states and its influence on the application." Applied energy 102 (2013): 885-897.

Weng, Caihao, Jing Sun, and Huei Peng. "Model parametrization and adaptation based on the invariance of support vectors with

(56) References Cited

OTHER PUBLICATIONS applications to battery state-of-health monitoring." IEEE Transactions on Vehicular Technology 64.9 (2014): 3908-3917.

Xia, Zhiyong, and Jaber A. Abu Qahouq. "Adaptive and fast state of health estimation method for lithium-ion batteries using online complex impedance and artificial neural network." 2019 IEEE applied power electronics conference and exposition (APEC). IEEE, 2019, pp. 3361-3365.

Xia, Zhiyong, et al. "A simple and upgradable autonomous battery aging evaluation and test system with capacity fading and AC impedance spectroscopy measurement." 2017 IEEE Applied Power Electronics Conference and Exposition (APEC). IEEE, 2017, pp. 951-958.

Yarlagadda, Sriram, Tom T. Hartley, and Iqbal Husain. "A battery management system using an active charge equalization technique based on a DC/DC converter topology." IEEE Transactions on Industry Applications 49.6 (2013): 2720-2729.

Young, Chung-Ming, et al. "A single-phase multilevel inverter with battery balancing." IEEE Transactions on Industrial Electronics 60.5 (2012): 1972-1978.

Yuan, Hsiang-Fu, and Lan-Rong Dung. "Offline state-of-health estimation for high-power lithium-ion batteries using three-point impedance extraction method." IEEE Transactions on Vehicular Technology 66.3 (2016): 2019-2032.

Yuanmao, Ye, Ka Wai Eric Cheng, and Y. P. B. Yeung. "Zero-current switching switched-capacitor zero-voltage-gap automatic equalization system for series battery string." IEEE transactions on power electronics 27.7 (2011): 3234-3242.

Zhang, Huakai, et al. "Active battery equalization method based on redundant battery for electric vehicles." IEEE transactions on vehicular technology 68.8 (2019): 7531-7543.

\* cited by examiner

DETERMINING STATE-OF-HEALTH OF AN ENERGY STORAGE DEVICE USING COMPLEX IMPEDANCE SPECTRUM

CROSS-REFERENCE TO RELATED APPLICATIONS

This application is a U.S. National Stage application filed under 35 U.S.C. § 371 of PCT/US2022/018094 filed on Feb. 28, 2022, which claims the benefit of U.S. Provisional Patent application No. 63/181,430 filed on Apr. 29, 2021, and titled "SYSTEMS AND METHODS FOR DETERMINING THE STATE OF-HEALTH OF AN ENERGY STORAGE DEVICE USING THE INTERRELATED RELATIONSHIP BETWEEN MAGNITUDE AND PHASE OF THE COMPLEX IMPEDANCE SPECTRUM", the disclosure of which is expressly hereby incorporated herein by reference in their entirety.

STATEMENT REGARDING FEDERALLY FUNDED RESEARCH

This invention was made with government support under Grant no. 1509824 awarded by the National Science Foundation. The government has certain rights in the invention.

BACKGROUND

Electrochemical energy storage devices, such as batteries, especially those with high-energy density such as Lithium-Ion batteries, are increasingly being used in many applications that impact daily lives. The health of these devices can deteriorate unexpectedly, which can have catastrophic consequences related to safety, reliability, and efficiency. Conventional state of health (SOH) estimation methods include capacity-based methods, IC-DV-based methods, and impedance-based methods. Each of these conventional methods has limitations. For example, capacity-based methods are slow, require large historical data storage, suffer from error accumulation, and require complete charge and discharge cycles. IC-DV-based methods are slow, require at least one charging cycle, and accuracy of IC-DV-based methods are sensitive to voltage and current noise in the measurements. Impedance-based methods that utilize the DC or real component/part of the impedance (i.e., without the imaginary component/part of the complex impedance) in limited applications and lack accuracy. There has been increasing interest to utilize complex impedance values for SOH estimation. However, there has not been much success in identifying indicators and relationships that can be accurately used to estimate SOH. Moreover, these indicators and relationships are highly inaccurate when other battery conditions change such as State-Of-Charge (SOC). It is therefore desirable to accurately and quickly estimate the state of health (SOH) of energy storage devices.

SUMMARY

An example method for determining State-of-Health (SOH) for energy storage devices is described herein. The method includes measuring a complex impedance of an energy storage device for a range of frequency, and estimating a state of health (SOH) of the energy storage device based on an interrelationship between a magnitude and a phase of the complex impedance of the energy storage device.

In some implementations, the SOH of the energy storage device is estimated based on one or more features of the interrelationship between the magnitude and the phase of the complex impedance of the energy storage device. Features of the interrelationship can include, but are not limited to, a peak value of the interrelationship, a valley value of the interrelationship, a peak-to-valley value of the interrelationship, a number or location of peaks of the interrelationship, a number or location of valleys of the interrelationship, a value of a gradient or slope of the interrelationship, a distance between peaks of the interrelationship, a distance between valleys of the interrelationship, a distance between a peak and a valley, or a shape of the interrelationship.

Optionally, the method further includes generating a phase-magnitude plot of the complex impedance of the energy storage device. The phase-magnitude plot is a graphical representation of the interrelationship between the magnitude and the phase of the complex impedance of the energy storage device.

Alternatively or additionally, the SOH of the energy storage device is estimated based on one or more features of the phase-magnitude plot. Features of the phase-magnitude plot can include, but are not limited to, a peak value of the phase-magnitude plot, a valley value of the phase-magnitude plot, a peak-to-valley value of the phase-magnitude plot, a number or location of peaks of the phase-magnitude plot, a number or location of valleys of the phase-magnitude plot, a value of a gradient or slope of the phase-magnitude plot, a distance between peaks of the phase-magnitude plot, a distance between valleys of the phase-magnitude plot, a distance between a peak and a valley of the phase-magnitude plot, or a shape of the phase-magnitude plot.

Optionally, the method further includes providing a warning or fault message based on the SOH of the energy storage device.

In some implementations, the SOH of the energy storage device is estimated by inputting a plurality of data points from the interrelationship between the magnitude and the phase of the complex impedance of the energy storage device into a machine learning model, and predicting, using the machine learning model, the SOH of the energy storage device.

Alternatively or additionally, in some implementations, the SOH of the energy storage device is estimated by extracting the one or more features from the interrelationship between the magnitude and the phase of the complex impedance of the energy storage device, inputting the one or more extracted features into a machine learning model, and predicting, using the machine learning model, the SOH of the energy storage device.

Optionally, in some implementations, a plurality of data points from the interrelationship between the magnitude and the phase of the complex impedance of the energy storage device and the one or more extracted features are input into the machine learning model such that the SOH of the energy storage device is predicted based on both the one or more extracted features and the plurality of data points.

Optionally, in some implementations, a plurality of data points from the interrelationship between the magnitude and the phase of the complex impedance of the energy storage device are input into a machine learning model, and a fault or failure of the energy storage device is predicted using the machine learning model.

Optionally, in some implementations, the one or more features are extracted from the interrelationship between the magnitude and the phase of the complex impedance of the energy storage device, the one or more extracted features are input into a machine learning model, and a fault or failure of the energy storage device is predicted using the machine learning model.

In some implementations, the machine learning model is a supervised learning model, a semi-supervised learning model, or an unsupervised learning model. Optionally, the machine learning model is an artificial neural network.

Alternatively or additionally, the method optionally further includes estimating a capacity of the energy storage device based on the SOH of the energy storage device. Additionally, the method optionally further includes adjusting a state of charge (SOC) of the energy storage device based on the capacity of the energy storage device.

Alternatively or additionally, the energy storage device is a battery, a supercapacitor, or an electrochemical device.

A system for determining State-of-Health (SOH) for energy storage devices is described herein. The system includes a machine learning module that is configured to predict a state of health (SOH) of the energy storage device, and a computing device. The computing device includes a processor and a memory, the memory having computer-executable instructions stored thereon. The computing device is configured to receive a complex impedance of the energy storage device for a range of frequency, input an interrelationship between a magnitude and a phase of the complex impedance of the energy storage device into the machine learning module, and receive an output predicted by the machine learning module, where the output is the SOH of the energy storage device.

In some implementations, a plurality of data points from the interrelationship between the magnitude and the phase of the complex impedance of the energy storage device are input into the machine learning module. Additionally, the computing device is optionally further configured to extract one or more features from the interrelationship between the magnitude and the phase of the complex impedance of the energy storage device, and the one or more extracted features of the interrelationship are input into the machine learning module. Features of the interrelationship can include, but are not limited to, a peak value of the interrelationship, a valley value of the interrelationship, a peak-to-valley value of the interrelationship, a number or location of peaks of the interrelationship, a number or location of valleys of the interrelationship, a value of a gradient or slope of the interrelationship, a distance between peaks of the interrelationship, a distance between valleys of the interrelationship, a distance between a peak and a valley of the interrelationship, or a shape of the interrelationship.

Alternatively or additionally, the computing device is optionally further configured to generate a phase-magnitude plot of the complex impedance of the energy storage device. The phase-magnitude plot is a graphical representation of the interrelationship between the magnitude and the phase of the complex impedance of the energy storage device. In some implementations, a plurality of data points from the phase-magnitude plot are input into the machine learning module. Additionally, the computing device can optionally be further configured to extract one or more features of the phase-magnitude plot, and the one or more extracted features are input into the machine learning module. Features of the phase-magnitude plot can include, but are not limited to, a peak value of the phase-magnitude plot, a valley value of the phase-magnitude plot, a peak-to-valley value of the phase-magnitude plot, a number or location of peaks of the phase-magnitude plot, a number or location of valleys of the phase-magnitude plot, a value of a gradient or slope of the phase-magnitude plot, a distance between peaks of the phase-magnitude plot, a distance between valleys of the phase-magnitude plot, a distance between a peak and a valley of the phase-magnitude plot, or a shape of the phase-magnitude plot.

Alternatively or additionally, the computing device is optionally further configured to provide a warning or fault message based on the SOH of the energy storage device.

Alternatively or additionally, the computing device is optionally further configured to estimate a capacity of the energy storage device based on the SOH of the energy storage device. Additionally, the computing device is optionally further configured to adjust a state of charge (SOC) of the energy storage device based on the capacity of the energy storage device.

Alternatively or additionally, the output further includes a fault or failure of the energy storage device.

In some implementations, the machine learning module implements a supervised learning model, a semi-supervised learning model, or an unsupervised learning model. Optionally, the machine learning module is an artificial neural network.

Alternatively or additionally, the energy storage device is a battery, a supercapacitor, or an electrochemical device.

A method for estimating degradation of SOH is also described herein. The method includes measuring a complex impedance of an energy storage device for a range of frequency, and estimating a degradation in state of health (SOH) of the energy storage device based on an interrelationship between a magnitude and a phase of the complex impedance of the energy storage device.

In some implementations, a change in a gradient or slope of the interrelationship indicates that the degradation in SOH of the energy storage device is a permanent degradation in SOH. Alternatively or additionally, a change in a distance between a peak and a valley of the interrelationship without a change in a peak-to-valley value of the interrelationship indicates that the degradation in SOH of the energy storage device is a permanent degradation in SOH. Alternatively or additionally, a change in a distance between a peak and a valley of the interrelationship in combination with a change in a peak-to-valley value of the interrelationship indicates that the degradation in SOH of the energy storage device is a temporary degradation in SOH. Alternatively or additionally, a change in a peak-to-valley value of the interrelationship indicates an internal temperature change of the energy storage device.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 13A is a plot of magnitude versus frequency for the example lithium ion battery when SOC is 100% (i.e., same magnitude data as FIG. 5). FIG. 13B is a zoomed-in version of FIG. 13A with y-axis limited to about 300.0 mohm (mΩ). FIG. 13C is a plot of phase versus frequency for the example lithium ion battery when SOC is 100% (i.e., same phase data as FIG. 5).

FIG. 14A is a plot of magnitude versus frequency for the example lithium ion battery under different SOC conditions (i.e., same magnitude data as FIGS. 5-7 at ageing cycle point 120). FIG. 14B is a zoomed-in version of FIG. 14A with y-axis limited to about 150.0 mohm (mΩ). FIG. 14C is a plot of phase versus frequency for the example lithium ion battery under different SOC conditions (i.e., same phase data as FIGS. 5-7 at ageing cycle point 120).

DETAILED DESCRIPTION

Figure 1:
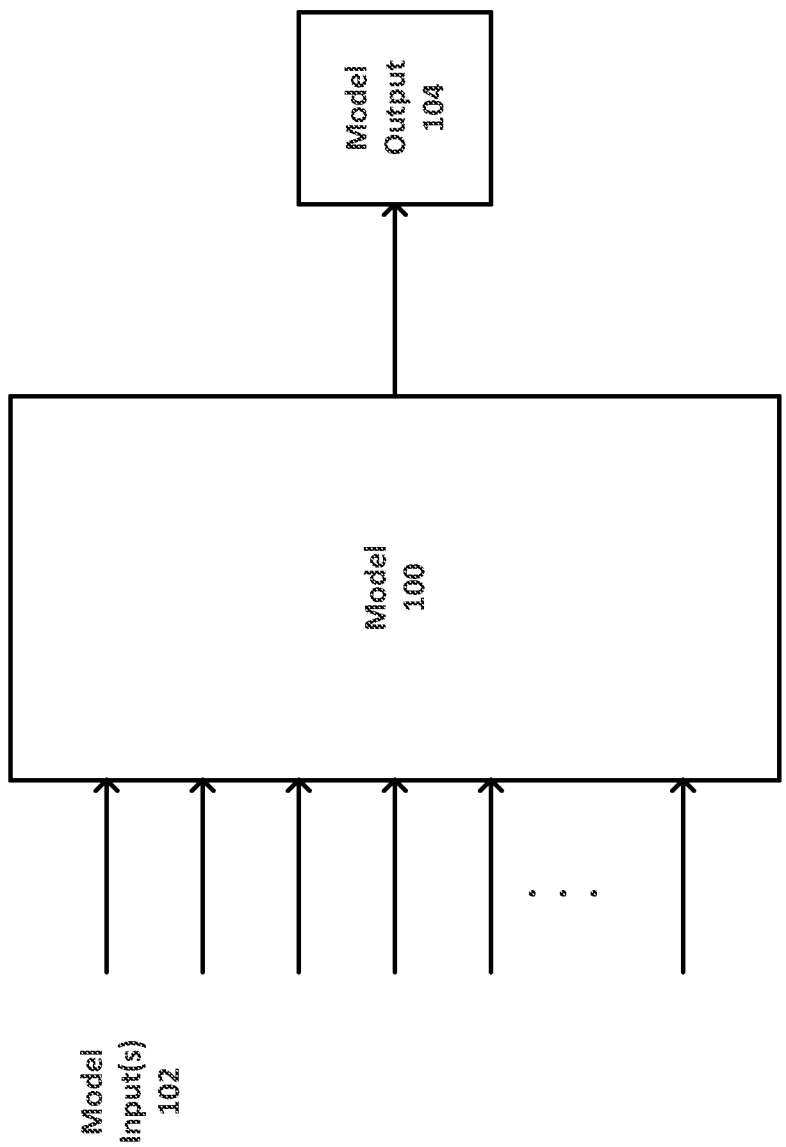
FIG. 1 is a diagram illustrating an example method for determining the State of Health (SOH) of an energy storage device according to implementations described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for determining State-of-Health (SOH) for a battery, it will become evident to those skilled in the art that the implementations are not limited thereto, but are applicable for other energy storage devices such as a supercapacitor or an electrochemical device.

Systems and methods for determining SOH of an energy storage device are described herein. The energy storage device can be, but is not limited to, a battery, a supercapacitor, or other electrochemical device. Other electrochemical devices can include, but are not limited to, biosensors, proximity sensors, or other device with electrochemical EIS. The systems and methods estimate the energy storage device's SOH from the interrelationship between the magnitude and phase of the complex impedance spectrum (also sometimes referred to as the "phase-magnitude relationship" or the "phase-magnitude function") of the energy storage device. The interrelationship is the combined relationship between magnitude and phase of the complex impedance spectrum. The interrelationship between the magnitude and phase of the complex impedance spectrum provides an indicator or signature of the health of the energy storage device. In some implementations, the interrelationship between the magnitude and phase of the complex impedance spectrum is optionally captured by a phase-magnitude (or magnitude-phase) plot of the complex impedance. In other words, the phase-magnitude plot described herein is a graphical representation of the interrelationship between magnitude and phase of the complex impedance spectrum. As shown in FIGS. 4-8, magnitude and phase are plotted together as a function of frequency, i.e., each of magnitude and phase on one of the x-axis and y-axis. Frequency is not plotted on either axis of the phase-magnitude plot. Alternatively or additionally, SOH is optionally estimated using machine learning models or algorithms in some implementations described herein.

Figure 4:
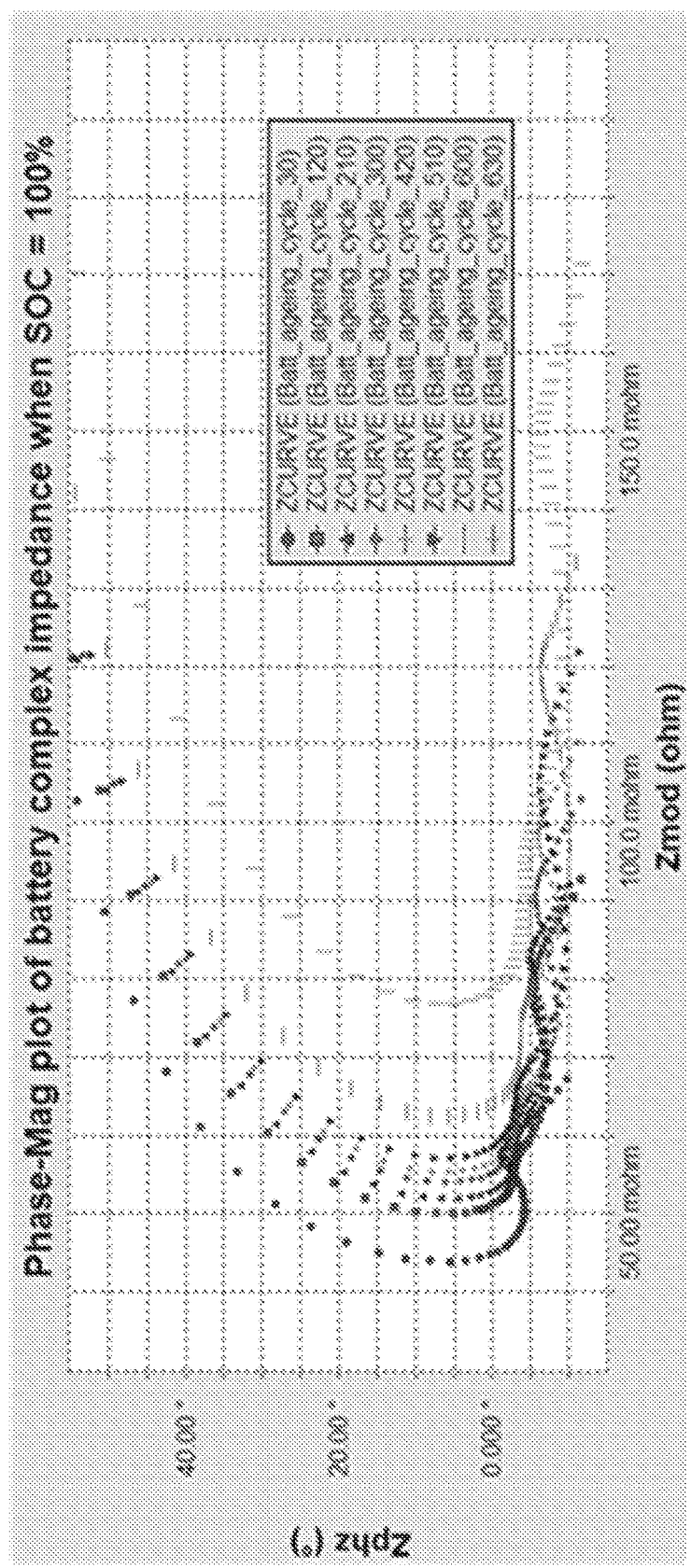
FIG. 4 is the phase-magnitude plot showing complex impedance of an example lithium ion battery when State of Charge (SOC) is 100% for a plurality of ageing cycle points (i.e., cycles 30, 120, 210, 300, 420, 510, 600, and 630).
Figure 5:
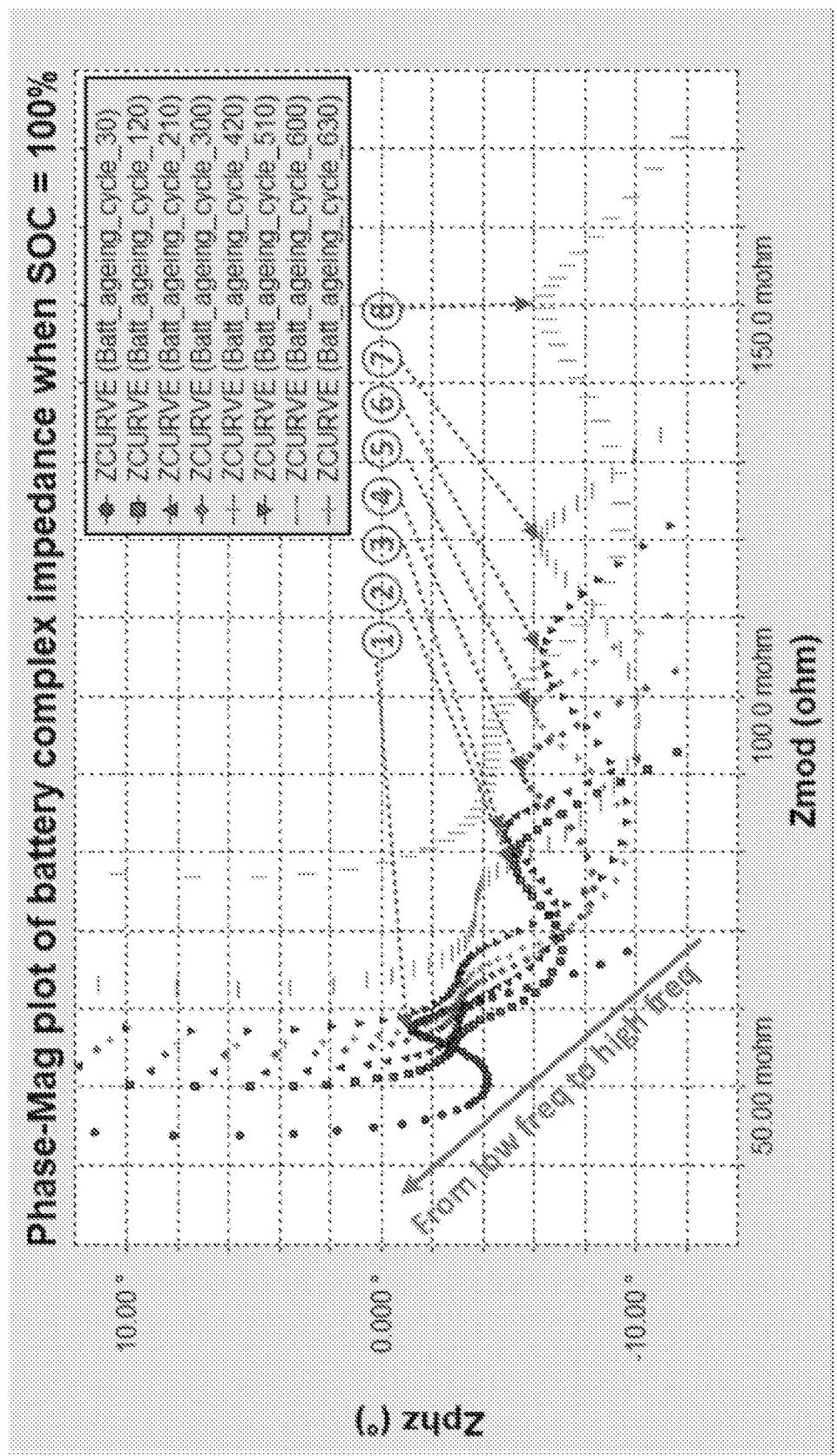
FIG. 5 is a zoomed-in version of the phase-magnitude plot of FIG. 4 (i.e., y-axis limited between about −14.000° and +12.000°).
Figure 6:
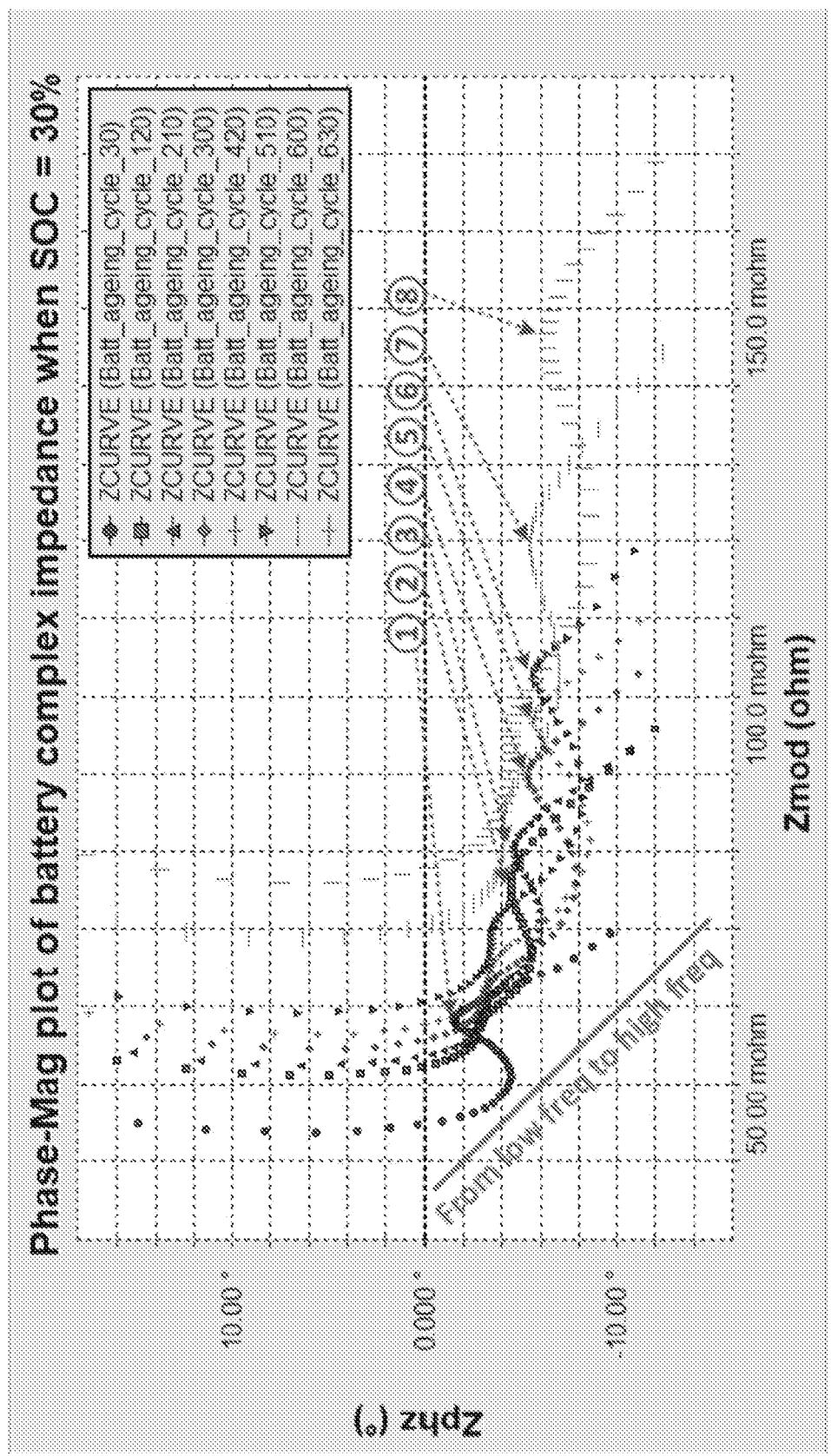
FIG. 6 is the phase-magnitude plot showing complex impedance of the example lithium ion battery of FIG. 4 when SOC is 30% for the plurality of ageing cycle points.

As described above, the phase-magnitude relationship can optionally be plotted or represented graphically (i.e., a phase-magnitude or magnitude-phase plot), where the impedance magnitude is plotted on the x-axis (Zmod (ohms)) and the phase of the complex impedance is plotted on the y-axis (Zphz (°)). An example phase-magnitude plot is shown in FIG. 4. It should be understood that there is no frequency axis in this graphical representation. The phase-magnitude relationship described herein is therefore unlike and different from a conventional magnitude-frequency relationship (see e.g., FIGS. 13A, 13B, 14A, and 14B), which can be plotted or represented graphically with the frequency (Freq (Hz)) being plotted on the x-axis and the magnitude of the complex impedance (Zmod (ohms)) being plotted on the y-axis. Additionally, the phase-magnitude relationship described herein is therefore unlike and different from a conventional phase-frequency relationship (see e.g., FIGS. 13C and 14C), which can be plotted or represented graphically with the frequency (Freq (Hz)) being plotted on the x-axis and the phase of the complex impedance (Zphz (°)) being plotted on the y-axis. It should be understood that in each of the conventional magnitude-frequency and phase-frequency relationships frequency is plotted on one of the axes (i.e., x-axis). Further, the phase-magnitude relationship described herein is therefore unlike and different from a conventional real-imaginary relationship, which can be plotted or represented graphically with the real part of the complex impedance being plotted on the x-axis and the imaginary part of the complex impedance being plotted on the y-axis being. Thus, the other conventional interrelationships discussed above do not have the same characteristics, features, or indicators as phase-magnitude relationship described herein. Accordingly, the other conventional interrelationships discussed above do not allow for more accurate SOH estimation and as a result a more accurate capacity estimation and a more accurate SOC estimation as achieved by the systems and methods described herein.

Figure 13A:
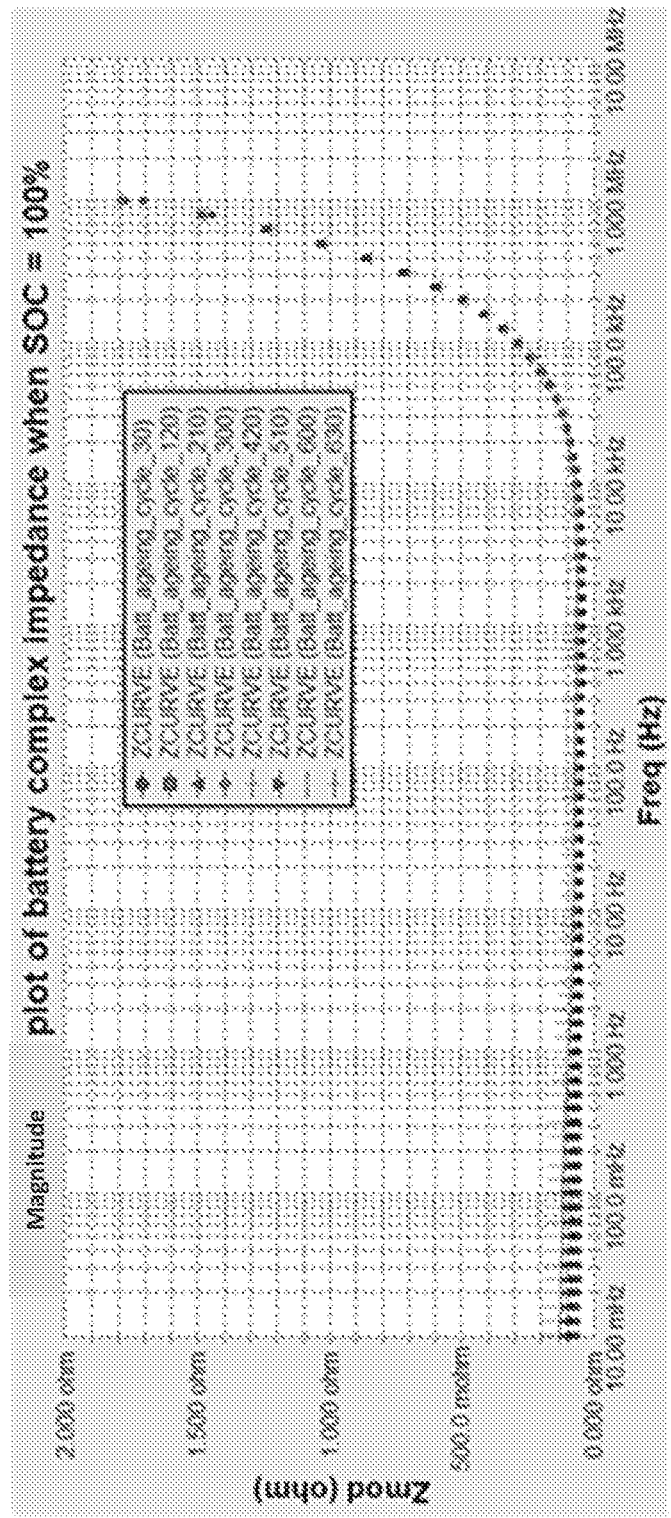
FIGS. 13A-13C are conventional EIS plots illustrating each of magnitude and phase, respectively, plotted as a function of frequency.
Figure 13B:
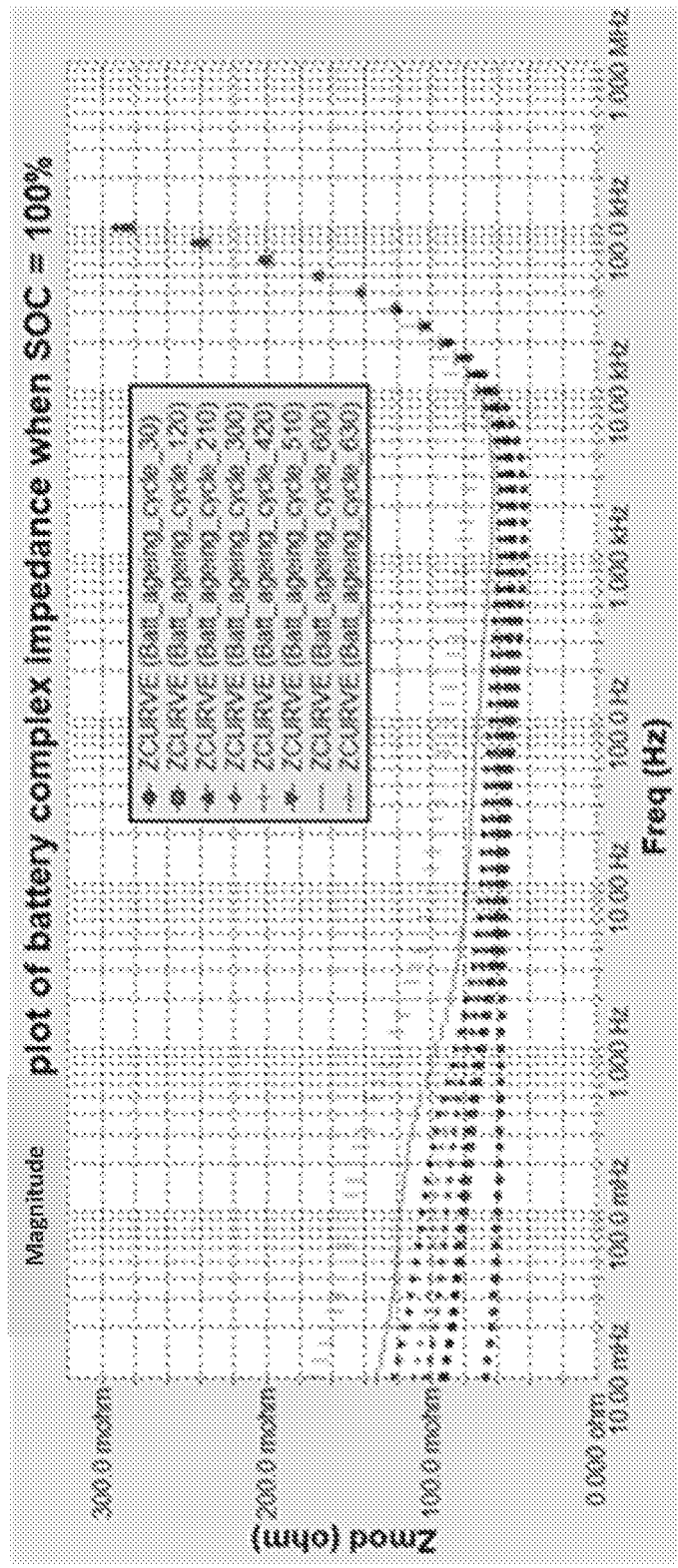
Figure 13C:
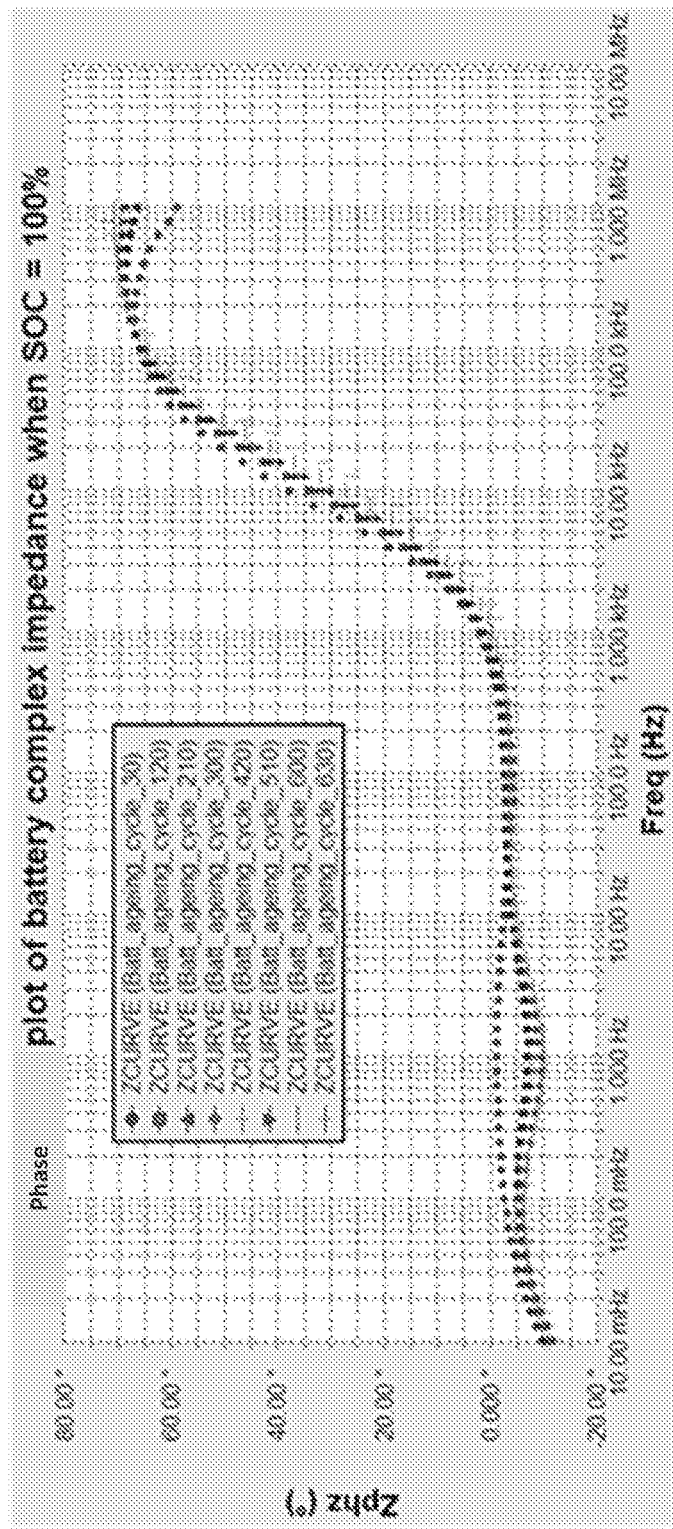
Figure 14A:
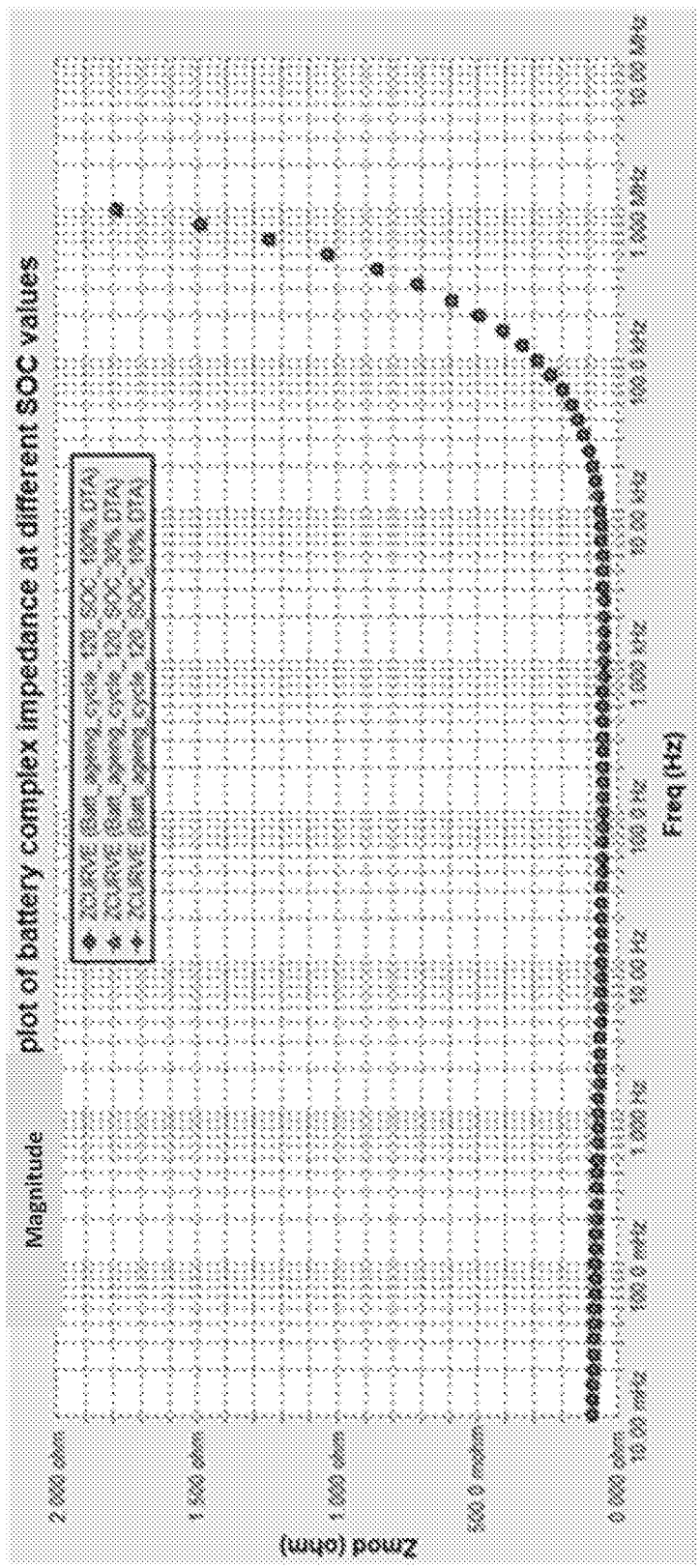
FIGS. 14A-14C are conventional EIS plots illustrating magnitude and phase, respectively, plotted as a function of frequency measurement results under the different SOC values shown in FIGS. 5-7 (i.e., 100%, 30%, 10%) at ageing cycle point 120.
Figure 14B:
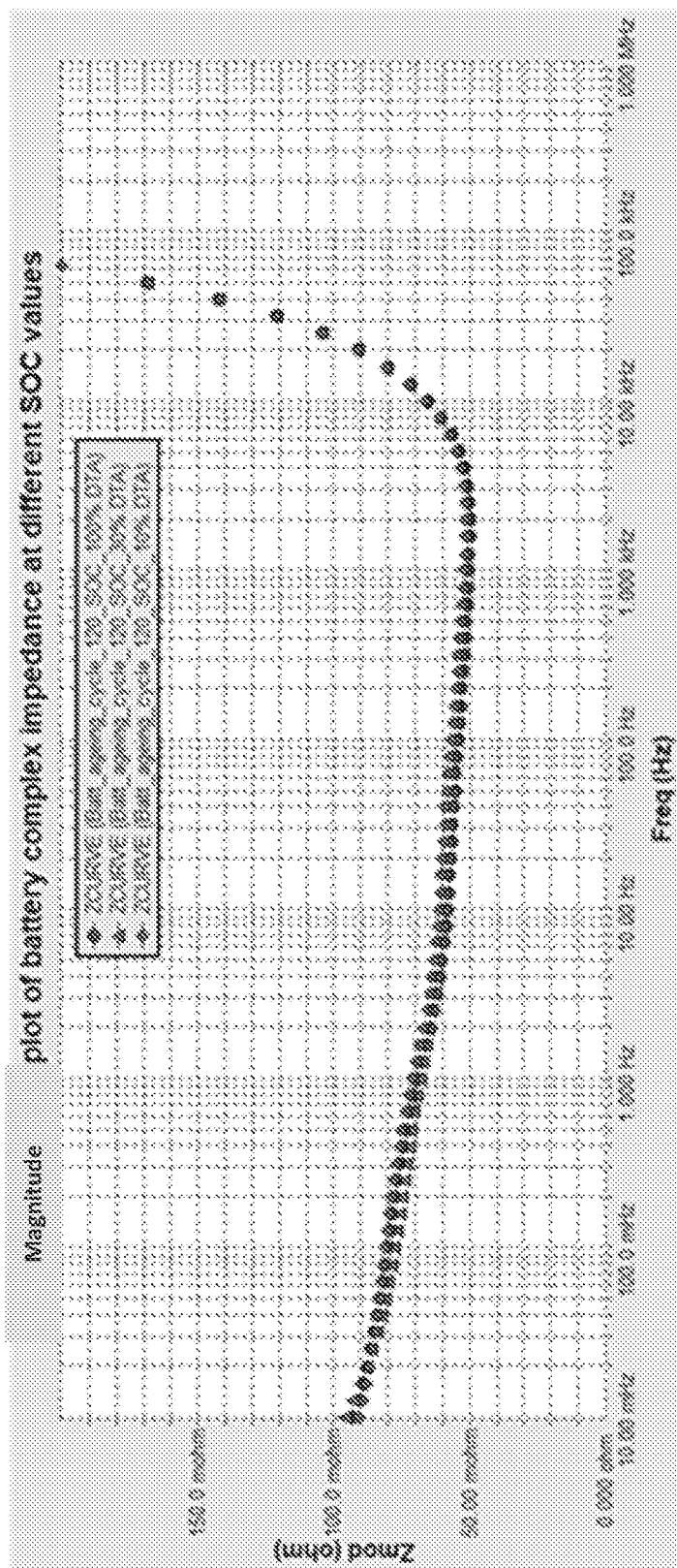
Figure 14C:
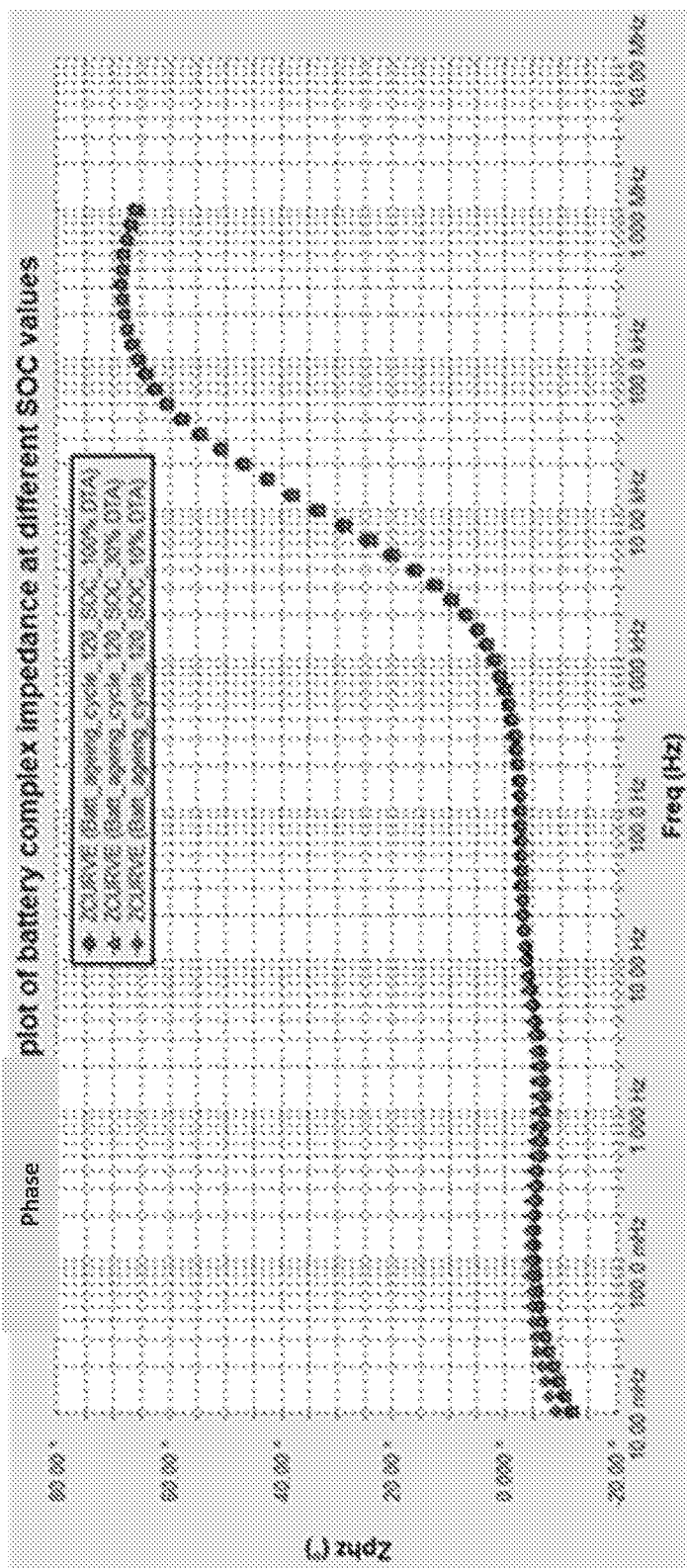

As noted above, the systems and methods described herein estimate SOH from the interrelationship between magnitude and phase of the complex impedance spectrum. Optionally, this interrelationship is graphically represented by a phase-magnitude plot as shown in FIGS. 4-8. According to conventional methods, each of the magnitude and phase components of EIS data is plotted separately as a function of frequency. As noted above, the phase-magnitude plot does not include an axis plotting frequency. Conventional magnitude versus frequency plots are shown in FIGS. 13A, 13B, 14A, and 14B, while conventional phase versus frequency plots are shown in FIGS. 13C and 14C. It can be observed that FIGS. 13A-13C do not exhibit the same SOH indicators or signatures present in FIGS. 4-8, which is a graphical representation of the interrelationship between magnitude and phase of the complex impedance spectrum. It can also be observed that FIGS. 14A-14C do not exhibit the same SOH-SOC indicators or signatures as FIGS. 4-8, which is a graphical representation of the interrelationship between magnitude and phase of the complex impedance spectrum. A plot of magnitude or frequency alone as a function of frequency (or the raw data) does not exhibit the same features or indicators as the interrelationship or phase-magnitude plot as described herein. In other words, there is no interrelationship between magnitude and phase of the complex impedance spectrum when each of magnitude and phase are considered separately as a function of frequency. Thus, it should be understood that the systems and methods described herein are based on the features, indicators, signatures, etc. present in the interrelationship described herein and/or plots shown in FIGS. 4-8.

Figure 7:
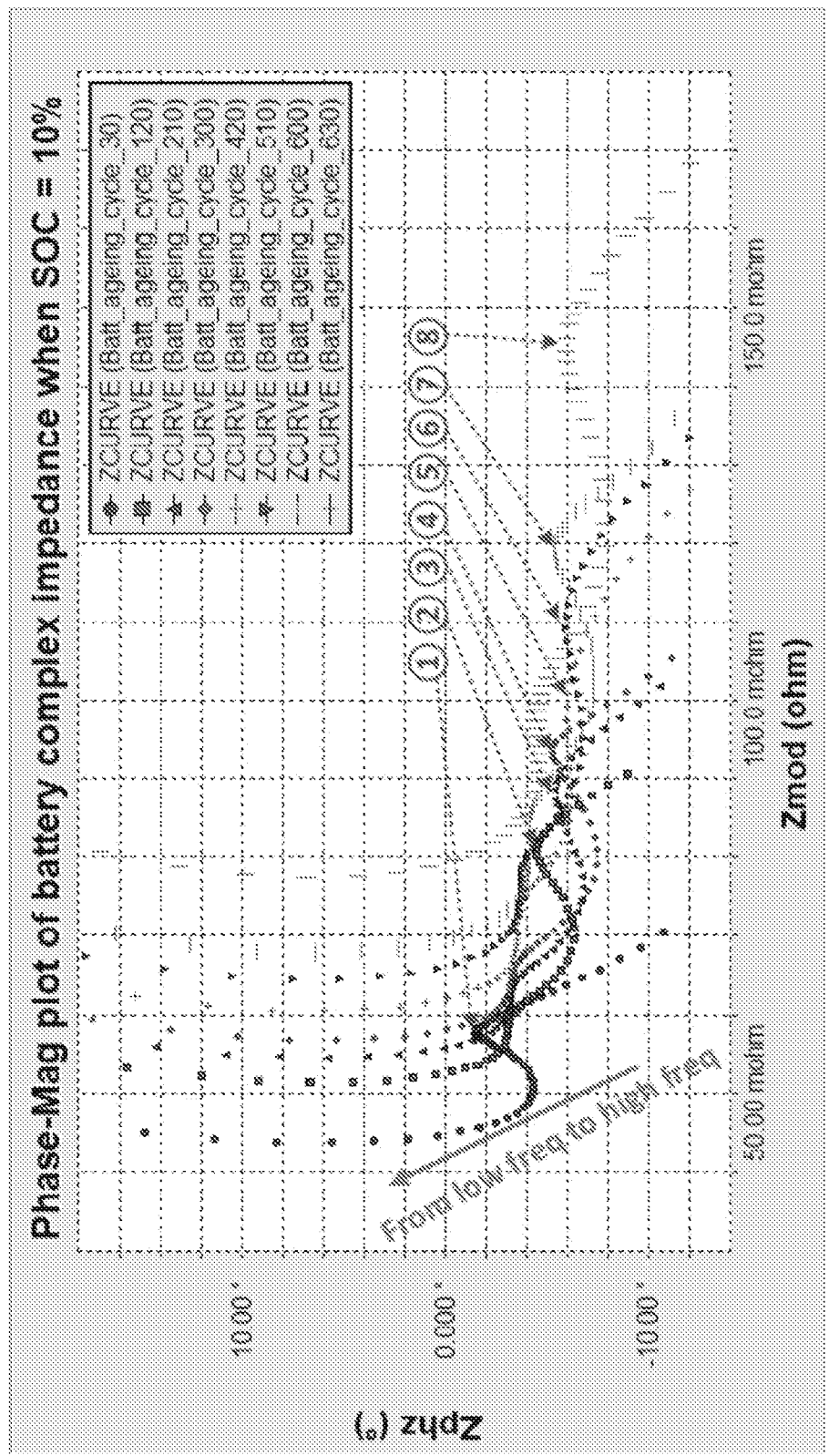
FIG. 7 is the phase-magnitude plot showing complex impedance of the example lithium ion battery of FIG. 4 when SOC is 10% for the plurality of ageing cycle points.

An example method can include measuring a complex impedance of the energy storage device, and estimating the energy storage device's SOH based on an interrelationship between a magnitude and a phase of the complex impedance of the energy storage device. FIGS. 4-7 illustrate how the interrelationship between the magnitude and phase of the complex impedance spectrum of a lithium ion battery provides an indicator of the battery's health. Each of FIGS. 4-7 includes the phase-magnitude plot for the battery at eight different ageing cycle numbers, i.e., plots for ageing cycles 30, 120, 210, 300, 420, 510, 600, and 630. The battery is at a different SOC in each figure, i.e., 100% (FIGS. 4 and 5), 30% (FIG. 6), and 10% (FIG. 7). As one example, the horizontal shift to the right (or left) of the phase-magnitude maximum (also referred to as "peak") points 1-8 in FIGS. 4-7 provides an indication of the battery's SOH. It should be understood that the shift in the phase-magnitude maximum points is only provided as an example indicator of the battery's SOH. Additional indicators include, but are not limited to: the horizontal shift to the right (or left) of the phase-magnitude minimum (also referred to as "valley") points, the horizontal distance between a maximum and minimum point in the phase-magnitude plot, the horizontal distance between two maximum points in the phase-magnitude plot, the horizontal distance between two minimum points in the phase-magnitude plot, the vertical distance between a maximum and minimum point in the phase-magnitude plot, and the shape of the phase-magnitude plot. As shown in FIGS. 4-7, horizontal distances represent a change in magnitude of the complex impedance spectrum, which is measured along the x-axis (e.g., change in Zmod (ohms)), and vertical distances represent a change in phase of the complex impedance spectrum, which is measured along the y-axis (e.g., change in Zphz (°)). It should be understood that plotting magnitude (Zmod (ohms)) on the x-axis and plotting phase (Zphz (°)) on the y-axis in FIGS. 4-7 is provided only as an example. It should be understood that the axes on which magnitude and phase are plotted can be reversed. While conventional methodologies may include utilizing impedance information (e.g., the DC or real component/part of the impedance) to estimate a battery's SOH, such conventional methodologies have not relied on the interrelationship between magnitude and phase, the phase-magnitude plot, and/or features of the interrelationship or plot as described below. Optionally, the battery's SOH can be used to perform battery control and/or safety actions as described herein.

Referring now to FIG. 1, a diagram illustrating an example method for determining the SOH of an energy storage device is shown. SOH is a measurement of the energy storage device's condition as compared to ideal (i.e., the specification for the energy storage device). For example, at the time of manufacture, the energy storage device typically has a SOH of 100% (i.e., meets specification), and the SOH is then expected to decrease over time as the energy storage device undergoes discharge/charge cycles. In the examples below (e.g., FIGS. 4-8), the energy storage device is a battery. It should be understood that a battery is provided only as an example energy storage device. This disclosure contemplates that the energy storage device may be an electrochemical device, a supercapacitor, a biosensor, or a proximity sensor. As shown in FIG. 1, a model 100 is used to estimate the SOH. As described herein, the model estimates the energy storage device's SOH based on the interrelationship between the magnitude and phase of the complex impedance spectrum of the energy storage device.

As shown in FIG. 1, the model 100 estimates the SOH (i.e., the model output 104) based on one or more model inputs 102. The model inputs 102 are the features, e.g., the data analyzed by a trained model operating in inference mode to predict the model output 104, which is sometimes referred to as the target. In some examples described herein, the target (i.e., model output 104) is the SOH of the energy storage device. It should be understood that SOH of the energy storage device is provided only as an example target. The model 100 can be trained and configured to predict a different target. For example, in some implementations, the model 100 can be configured to predict a fault or failure of the energy storage device. In other implementations, the model 100 can be configured to predict SOC or the ratio of available charge ($Q_{av}$) for the energy storage device. In other implementations, the model 100 can be configured to predict the temperature of the energy storage device. The model 100 can be trained with a training data set to accurately predict the target. For example, during training, weights, biases, parameters, rewards (e.g., Q-values), etc. associated with the model 100 are adjusted to minimize an objective function. Once complete, the trained model is configured for inference mode, e.g., the trained model can make predictions based upon new data. Optionally, as described herein, the model 100 is a machine learning model. The machine learning model may be a supervised learning model, a semi-supervised learning model, or an unsupervised learning model.

Figure 2:
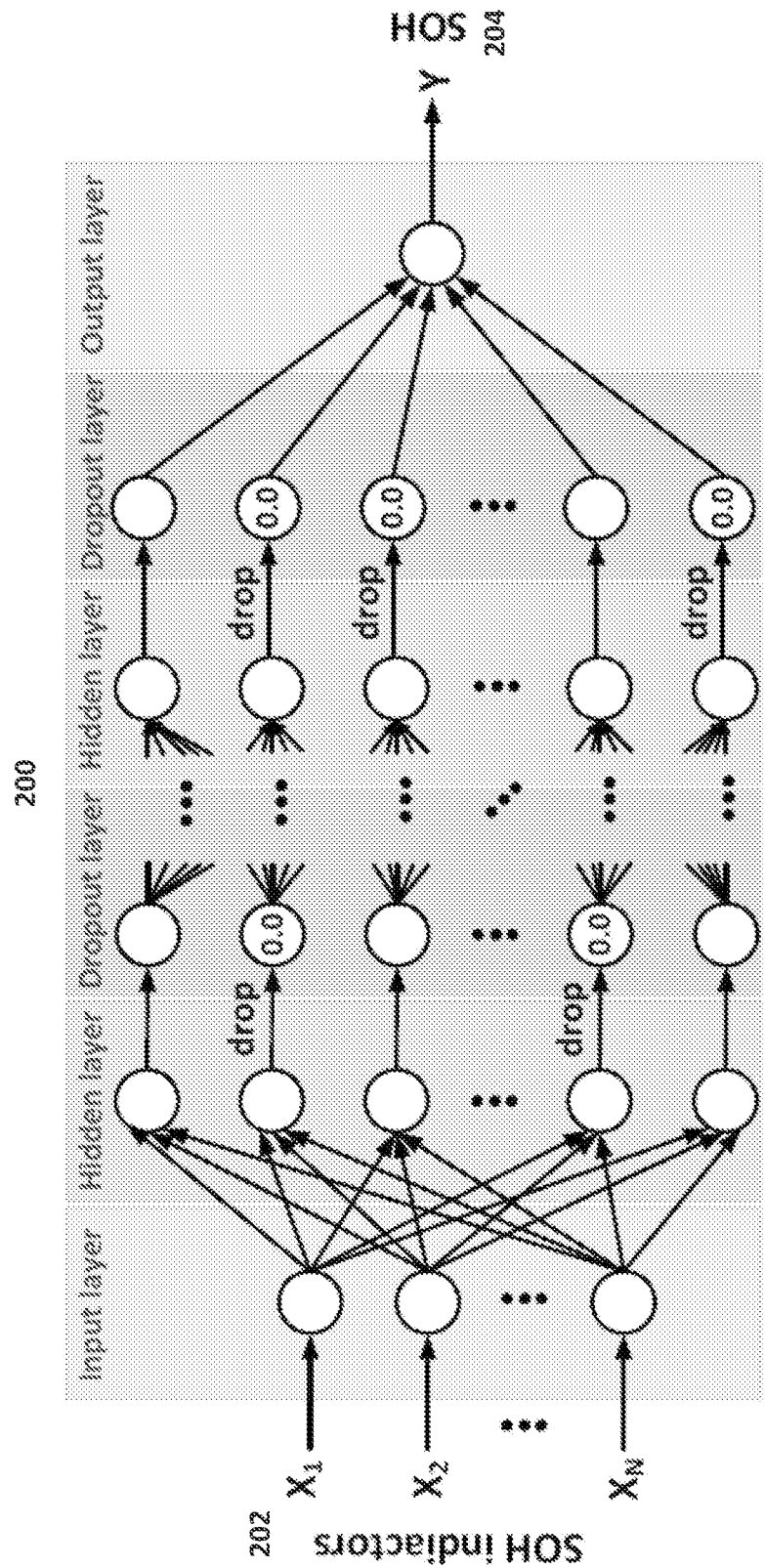
FIG. 2 is a diagram illustrating use of an artificial neural network to determine SOH of an energy storage device according to an implementation described herein.

In some implementations, the model 100 is an artificial neural network (see e.g., FIG. 2). An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can optionally be arranged in a plurality of layers such as input layer, output layer, and one or more hidden layers. Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tan H, or rectified linear unit (ReLU) function), and provide an output in accordance with the activation function. Additionally, each node is associated with a respective weight. ANNs are trained with a data set to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. It should be understood that any algorithm that finds the maximum or minimum of the objective function can be used to for training the ANN. Training algorithms for ANNs include, but are not limited to, backpropagation. It should be understood that artificial neural networks are provided only as examples. This disclosure contemplates using other machine learning models including, but not limited to regression.

This disclosure contemplates that a complex impedance of the energy storage device can be measured for a range of frequency. Examples include, but are not limited to, a frequency range of 0.1 Hertz (Hz) to 1 MHz. It should be understood that the frequency range for impedance measurement depends on the specifications of the energy storage device. For example, for conventional lithium-ion batteries, an upper value of 1 Mz provides sufficient complex impedance data. Optionally, frequency ranges of 10 Hz to 300 kHz or 10 Hz to 100 kHz provide sufficient complex impedance data for conventional lithium ion batteries. Optionally, a phase-magnitude relationship (which is optionally represented by a phase-magnitude plot) of the complex impedance of the energy storage device is generated from the data of the complex impedance, which is measured as described above. Example phase-magnitude plots are shown in FIGS. 4-7. The phase-magnitude relationship represented by a plot captures the interrelationship between the magnitude and the phase of the complex impedance over the range of frequency. As described herein, one or more SOH indicators or signatures can be identified in the phase-magnitude plot. The phase-magnitude plot therefore is a graphical representation of the interrelationship between the magnitude and the phase of the complex impedance of the energy storage device. As described above, the features, indicators, signature, etc. present in the interrelationship between magnitude and phase of the complex impedance spectrum are not found in conventional EIS plots (see, e.g., FIGS. 13A-14C), which plot each of magnitude and phase separately as a function of frequency. In some implementations described herein, data points and/or features from the interrelationship between the magnitude and the phase of the complex impedance of the energy storage device are the model inputs 102. Alternatively, in some implementations described herein, a phase-magnitude plot is generated and then data points and/or features from the phase-magnitude plot are the model inputs 102. Optionally, in some implementations described herein, data points and/or features from both the interrelationship between the magnitude and the phase of the complex impedance of the energy storage device and the phase-magnitude plot are the model inputs 102. Optionally, this disclosure contemplates that the model inputs 102 can also include energy storage device characteristics, which include, but are not limited to, voltage, temperature, or other conventional characteristic. The model 100 estimates the SOH (i.e., the model output) of the energy storage device based on the model inputs 102. Additionally, the model 100 can be used to estimate SOH while the energy storage device is operating, e.g., in real-time based on online impedance spectrum measurements. The predictions can therefore be provided on a time scale (e.g., millisecond or seconds time scale) much less than a duration of charge/discharge cycles (e.g. hours or days time scale).

In some implementations, the model inputs 102 include one or more data points of the interrelationship between the magnitude and the phase of the complex impedance of the energy storage device. In this implementation, the interrelationship is present in the data. The data points can include, but are not limited to, the value of the magnitude or phase for a point in the complex impedance spectrum. Optionally, the model inputs 102 include all data points representing the interrelationship between the magnitude and the phase of the complex impedance. Optionally, the model inputs 102 include only a portion of the data points representing the interrelationship between the magnitude and the phase of the complex impedance. It should be understood that the data points of the interrelationship between the magnitude and the phase of the complex impedance of the energy storage device serve as SOH indicators or signatures.

Alternatively or additionally, in some implementations, the model inputs 102 include one or more data points of the phase-magnitude plot. As described herein, the phase-magnitude plot is a graphical representation of the interrelationship between magnitude and phase of the complex impedance (e.g., see FIGS. 4-8). The data points can include, but are not limited to, the value of the magnitude or phase for a point in the phase-magnitude plot. Optionally, the model inputs 102 include all data points representing the phase-magnitude plot. Optionally, the model inputs 102 include only a portion of the data points representing the phase-magnitude plot. It should be understood that the data points of the phase-magnitude plot serve as SOH indicators or signatures.

Alternatively or additionally, in some implementations, the model inputs 102 include one or more features extracted from the interrelationship between the magnitude and the phase of the complex impedance of the energy storage device. These extracted features can include, but are not limited to, a peak (e.g., local maximum) value of the interrelationship, a valley (e.g., local minimum) value of the interrelationship, a peak-to-valley value of the interrelationship, a number or location of peaks (e.g., local maxima) of the interrelationship, a number or location of valleys (e.g., local minima) of the interrelationship, a value of a gradient or slope of the interrelationship, a distance between peaks of the interrelationship, a distance between valleys of the interrelationship, a distance between a peak and a valley of the interrelationship, and a shape of the interrelationship. Alternatively or additionally, extracted features can include a horizontal shift between a peak and valley of the interrelationship, which is a change in magnitude value, or a vertical shift between a peak and valley of the interrelationship, which is a change in phase value. It should be understood that the features extracted from the phase-magnitude plot serve as SOH indicators or signatures.

Alternatively or additionally, in some implementations, the model inputs 102 include one or more features extracted from the phase-magnitude plot. These extracted features can include, but are not limited to, a peak value of the phase-magnitude plot, a valley value of the phase-magnitude plot, a peak-to-valley value of the phase-magnitude plot, a number or location of peaks of the phase-magnitude plot, a number or location of valleys of the phase-magnitude plot, a value of a gradient or slope of the phase-magnitude plot, a distance between peaks of the phase-magnitude plot, a distance between valleys of the phase-magnitude plot, a distance between a peak and a valley of the phase-magnitude plot, and a shape of the phase-magnitude plot. Alternatively or additionally, extracted features can include a horizontal shift between a peak and valley of the phase-magnitude plot, which is a change in magnitude value (see x-axis in FIGS. 4-8), or a vertical shift between a peak and valley of the phase-magnitude plot, which is a change in phase value (see y-axis in FIGS. 4-8). It should be understood that the features extracted from the interrelationship between the magnitude and the phase of the complex impedance of the energy storage device serve as SOH indicators or signatures.

Alternatively or additionally, in some implementations, the model inputs 102 include characteristics of the energy storage device such as voltage, temperature, or other conventional characteristic.

Optionally, in some implementations, a warning or fault message can be provided based on the SOH of the energy storage device. Alternatively or additionally, a capacity of the energy storage device can be estimated based on the SOH of the energy storage device. Additionally, a state of charge (SOC) of the energy storage device can optionally be adjusted based on the capacity of the energy storage device (see e.g., FIG. 15).

Figure 8:
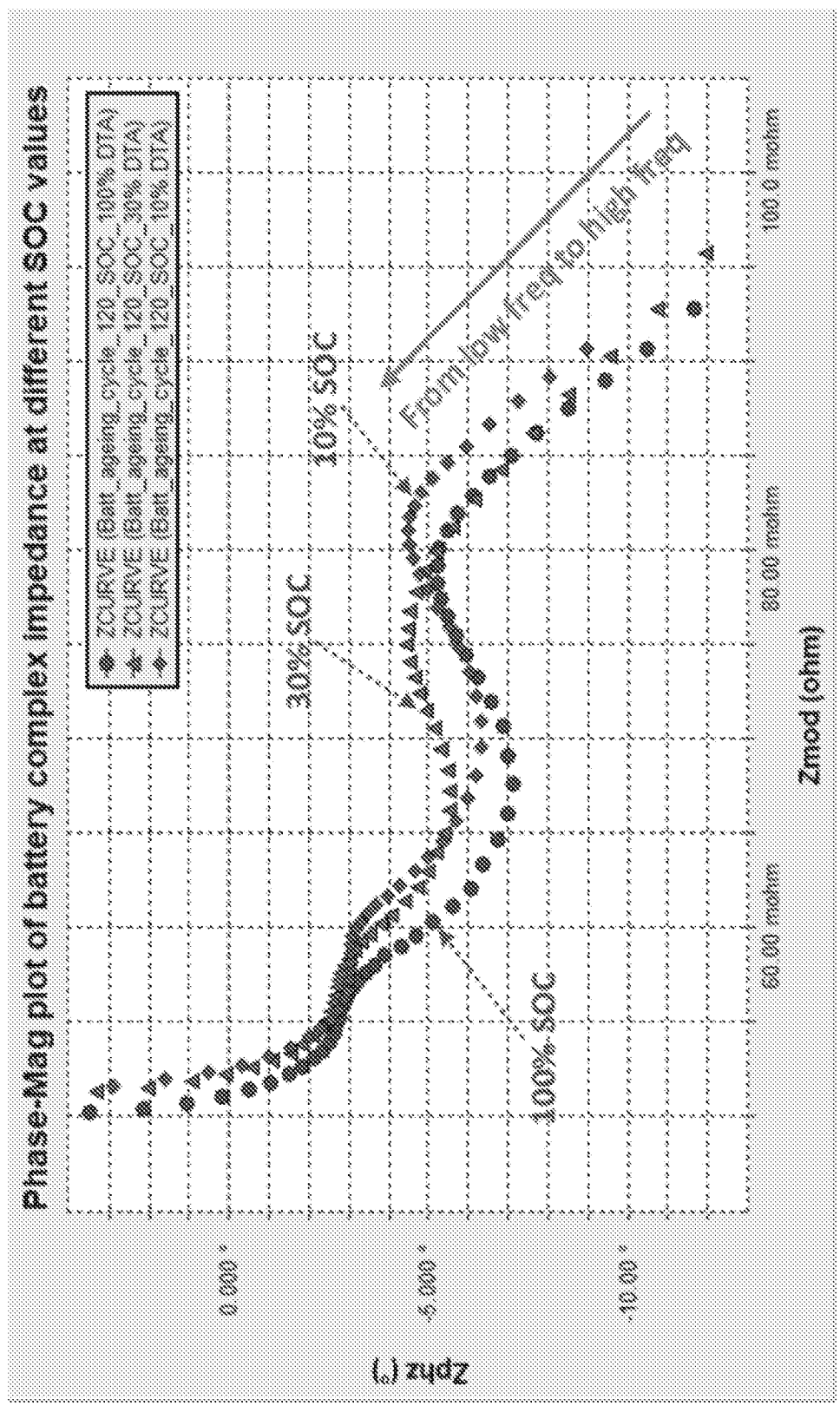
FIG. 8 illustrates example electrochemical impedance spectroscopy (EIS) measurement results under the different SOC values shown in FIGS. 5-7 (i.e., 100%, 30%, 10%) at the same ageing cycle point (i.e., ageing cycle point 120).

As described above, this disclosure contemplates that the model output 104 may be a target other than SOH of the energy storage device. For example, a model can be trained and configured to predict a SOC or $Q_{av}$ of the energy storage device. FIG. 8 illustrates EIS measurement results under SOC values 100%, 30% and 10% at the same ageing cycle point, i.e., 120. FIG. 8 demonstrates how the interrelationship between the magnitude and phase of the complex impedance spectrum of the battery at a given ageing cycle provides an indicator of the battery's SOC. Thus, the model inputs may be data points and/or extracted features from a phase-magnitude plot at a given ageing cycle such that the trained model predicts SOC or $Q_{av}$ of the energy storage device. The SOC or $Q_{av}$ for each battery or energy storge device in the system can be scaled (to a smaller or larger value) based on the phase-magnitude based indicators or signatures or based on the SOH determined by these phase-magnitude based indicators or signatures. In other implementations, the model output 104 may be the temperature of the energy storage device (see e.g., FIGS. 10 and 12) or a fault or failure of the energy storage device.

As described above, the model 100 may be an artificial neural network. Referring now to FIG. 2, the artificial neural network may be a deep neural network 200, i.e., a neural network including a plurality of hidden layers between the input and output layers. When operating in inference mode, the deep neural network 200 is configured to predict an energy storage device's SOH 204 (i.e., the target) based on a plurality of SOH indicators 202 (i.e., the features). This disclosure contemplates that the SOH indicators 202 can include, but are not limited to, data points and/or extracted features from the interrelationship between the magnitude and the phase of the complex impedance of an energy storage device, data points and/or extracted features from a phase-magnitude plot of the complex impedance of the energy storage device, and/or conventional characteristics of the energy storage device (e.g., voltage, temperature, etc.).

Referring now to FIGS. 9A-12, example features of the interrelationship between the magnitude and the phase of the complex impedance spectrum of an energy storage device are described.

Figure 9A:
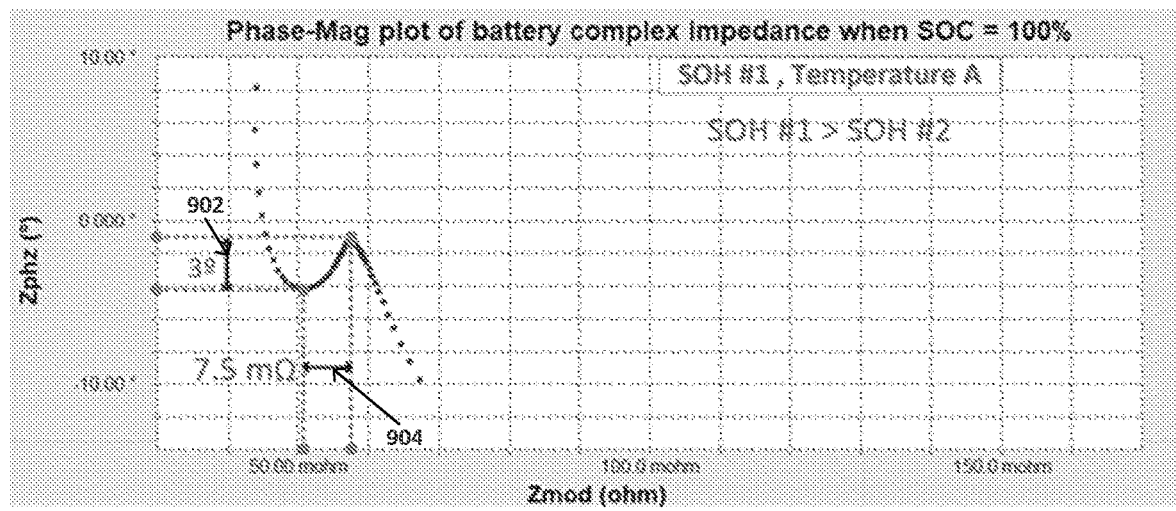
FIGS. 9A and 9B are phase-magnitude plots showing complex impedance of an example lithium ion battery at two different states of health (SOH). The SOH of the battery in FIG. 9A (i.e., SOH #1) is greater than the SOH of the battery in FIG. 9B (i.e., SOH #2). Complex impedance spectrum was captured at the same temperature (i.e., Temperature A) for both figures.
Figure 9B:
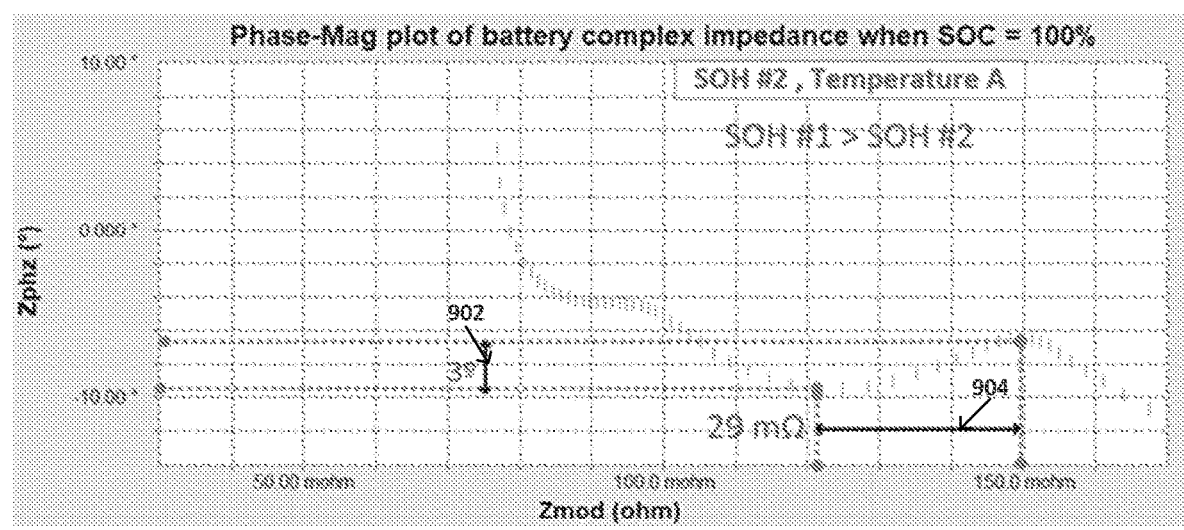

FIGS. 9A and 9B are phase-magnitude plots showing complex impedance of an example lithium ion battery at two different states of health. The SOH of the battery in FIG. 9A (i.e., SOH #1) is greater than the SOH of the battery in FIG. 9B (i.e., SOH #2). Complex impedance spectrum was captured at the same temperature (i.e., Temperature A) for both figures. FIGS. 9A and 9B demonstrate that a magnitude differential (e.g., measured on the x-axis) between phase peak and valley values (e.g., plotted on the y-axis) provides an indication of the SOH of the lithium ion battery. For example, the peak-to-valley differential features are labeled 902 (i.e., 3° in FIGS. 9A and 9B), and the distance between peak and valley features are labeled 904 (i.e., 7.5 mΩ and 29 mΩ respectively in FIGS. 9A and 9B). Thus, the magnitude differential (7.5 mΩ vs. 29 mΩ) provides an indication of the declining SOH of the lithium ion battery between FIG. 9A (SOH #1) and FIG. 9B (SOH #2). It is noted that the phase differential between phase peak and valley values did not change between FIGS. 9A and 9B. Additionally, this disclosure contemplates that a sudden change the magnitude differential (e.g., measured on the x-axis and represented by reference number 904) may be indicative of a suddenly occurring degradation in SOH, failure and/or near failure condition. Such a sudden SOH degradation may be a permanent degradation or a temporary degradation (e.g., when temperature decreases which may become permanent based on usage and/or stress).

Figure 10:
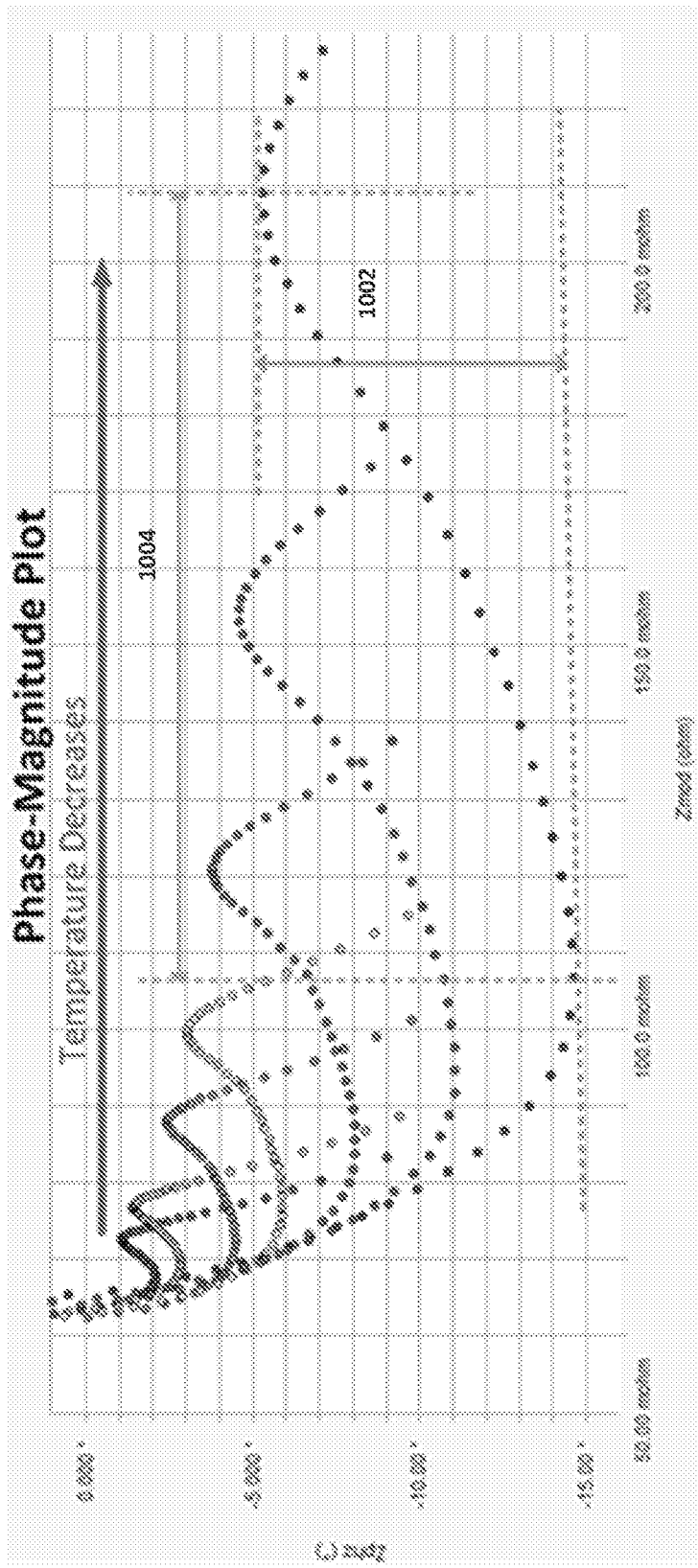
FIG. 10 is a phase-magnitude plot showing complex impedance of an example lithium ion battery at different temperatures.

FIG. 10 is a phase-magnitude plot showing complex impedance of an example lithium ion battery at different temperatures. FIG. 10 demonstrates that a phase differential between phase peak and valley values (e.g., measured on the y-axis) provides an indication of the SOH of the lithium ion battery as a result of temperature change. For example, in FIG. 10, the peak-to-valley differential feature is labeled 1002, and the distance between peak and valley feature is labeled 1004. The phase differential provides an indication of temperature while the magnitude differential provides an indication the declining SOH of the lithium ion battery as temperature decreases, which is usually a temporary SOH decline until the temperature increases again but may become permanent SOH decline under certain usage or conditions. In other words, the differential change in phase (e.g., plotted and measured on the y-axis) may be indicative that the decline in SOH is due to temperature and not necessarily permanent due to battery permanent ageing. This is unlike the case in FIGS. 4-9 under the same temperature where the differential phase did not change but the differential magnitude (e.g., plotted and measured on the x-axis) did change which may be indicative of permanent decline in SOH due to ageing. Alternatively or additionally, FIG. 10 demonstrates that a magnitude differential (e.g., measured on the x-axis) between phase peak and valley values (e.g., plotted on the y-axis) provides an indication of the SOH of the lithium ion battery. The magnitude differential provides an indication of the declining SOH of the energy storage device as temperature decreases. In FIG. 10, consecutive peak and valley points are used to determine magnitude and phase differentials. It should be understood that this is provided only as an example. This disclosure contemplates that magnitude and/or phase differential may be computed across a wider range of data.

Figure 11A:
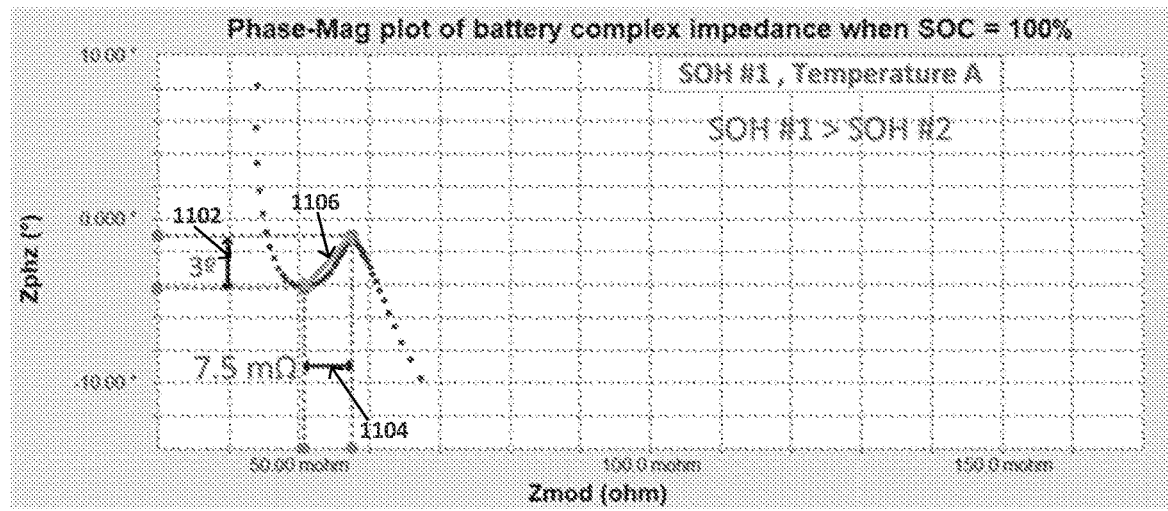
FIGS. 11A and 11B are phase-magnitude plots showing complex impedance of an example lithium ion battery at two different states of health (SOH). The SOH of the battery in FIG. 11A (i.e., SOH #1) is greater than the SOH of the battery in FIG. 11B (i.e., SOH #2). Complex impedance spectrum was captured at the same temperature (i.e., Temperature A) for both figures.
Figure 11B:
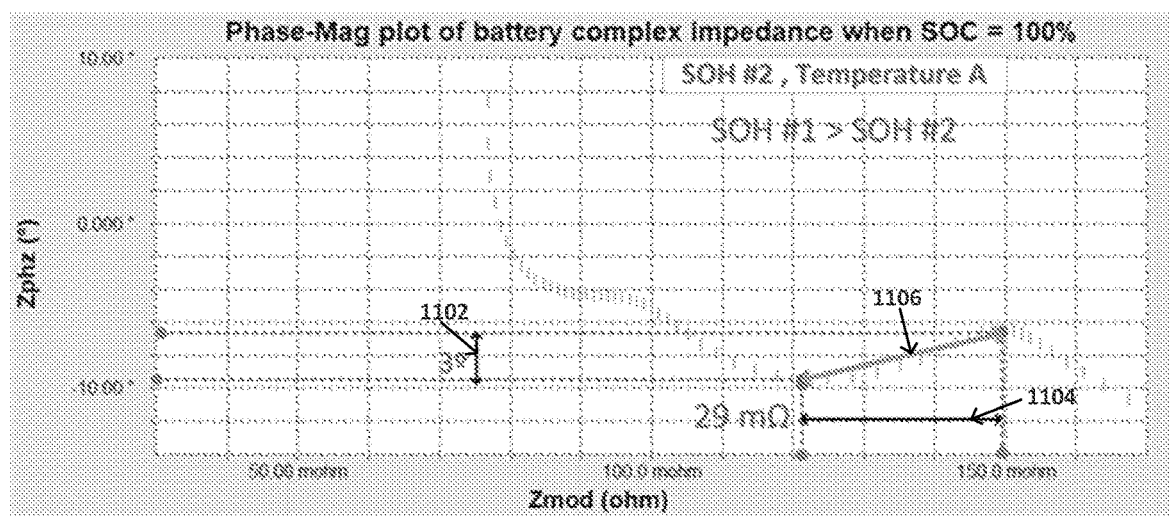

FIGS. 11A and 11B are phase-magnitude plots showing complex impedance of an example lithium ion battery at two different states of health (SOH). The SOH of the battery in FIG. 11A (i.e., SOH #1) is greater than the SOH of the battery in FIG. 11B (i.e., SOH #2). Complex impedance spectrum was captured at the same temperature (i.e., Temperature A) for both figures. Similarly to FIGS. 9A and 9B, FIGS. 11A and 11B demonstrate that a magnitude differential (e.g., measured on the x-axis) between phase peak and valley values (e.g., plotted on the y-axis) provides an indication of the SOH of the lithium ion battery. For example, the peak-to-valley differential features are labeled 1102 (i.e., 3° in FIGS. 11A and 11B), and the distance between peak and valley features are labeled 1104 (i.e., 7.5 mΩ and 29 mΩ respectively in FIGS. 11A and 11B). Thus, the magnitude differential (7.5 mΩ vs. 29 mΩ) provides an indication of the declining SOH of the lithium ion battery between FIG. 11A (SOH #1) and FIG. 11B (SOH #2). It is noted that the phase differential between phase peak and valley values did not change between FIGS. 11A and 11B. Alternatively or additionally, a gradient or slope of a line connecting peak and valley points in the interrelationship between the magnitude and the phase of the complex impedance spectrum of the lithium ion battery may be used as an SOH indicator. For example, the gradient or slope features are labeled as 1106. Thus, the change in gradient or slope of the line connecting peak and valley points provides an indication of the declining SOH of the lithium ion battery between FIG. 11A (SOH #1) and FIG. 11B (SOH #2).

Figure 12:
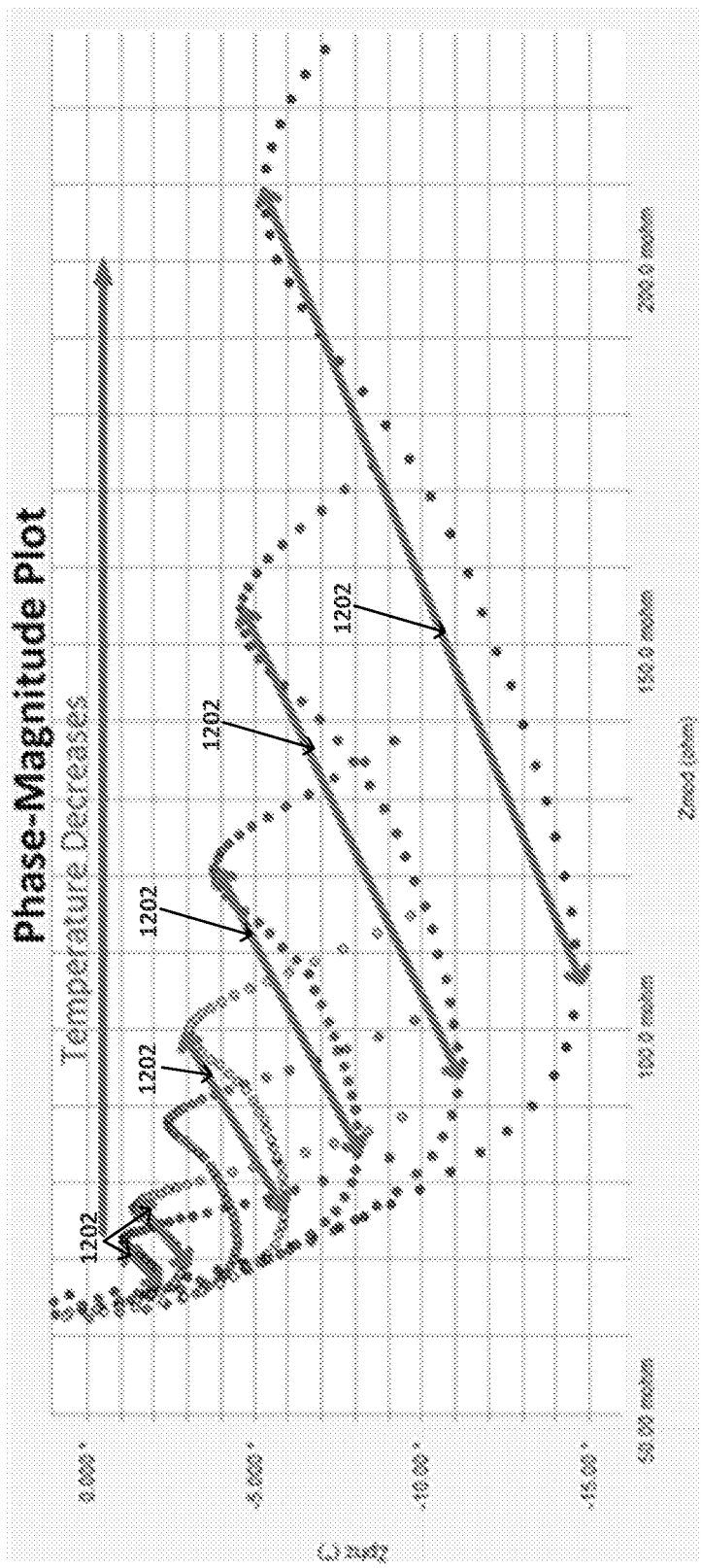
FIG. 12 is a phase-magnitude plot showing complex impedance of an example lithium ion battery at different temperatures.

FIG. 12 is a phase-magnitude plot showing complex impedance of an example lithium ion battery at different temperatures. FIG. 12 demonstrates that the gradient or slope of the line connecting peak and valley points provides an indication of the declining SOH of the lithium ion battery. For example, the gradient or slope features are labeled 1202. Thus, the change in gradient or slope of the line connecting peak and valley points provides an indication of the declining SOH of the lithium ion battery as temperature decreases. The change in gradient or slope of the line connecting peak and valley points is less dependent on change in temperature (e.g., compare the features shown in FIGS. 10 and 12). Instead, the change in gradient or slope of the line connecting peak and valley points may be more indicative of a permanent degradation of SOH.

In summary, this disclosure contemplates that the change in gradient or slope of the line connecting peak and valley points may be more indicative of a permanent change of SOH. This is discussed above with regard to FIG. 12. Alternatively or additionally, this disclosure contemplates that the change in magnitude differential (e.g., horizontal distance between peak and valley points) when there is no change in phase differential (e.g., vertical distance between peak and valley points) may be indicative of a permanent change of SOH. This is discussed above with regard to FIGS. 9A, 9B, 11A, and 11B. Alternatively or additionally, this disclosure contemplates that the change in magnitude differential (e.g., horizontal distance between peak and valley points) when there is a change in phase differential (e.g., vertical distance between peak and valley points) may be indicative of a temporary change of SOH due to temperature change. This is discussed above with regard to FIG. 10. Alternatively or additionally, this disclosure contemplates that the change in phase differential (e.g., vertical distance between peak and valley points) may be indicative of the internal temperature change. This is discussed above with regard to FIG. 10.

It should be understood that magnitude differential (e.g., horizontal distance between peak and valley points), phase differential (e.g., vertical distance between peak and valley points), and gradient or slope of a line connecting peak and valley points as shown in FIGS. 9A-12 are only provided as example features of the interrelationship between the magnitude and the phase of the complex impedance spectrum of an energy storage device that can be used according to the techniques described herein. As described above, features may include, but are not limited to, a peak value of the interrelationship, a valley value of the interrelationship, a peak-to-valley value of the interrelationship, a number or location of peaks of the interrelationship, a number or location of valleys of the interrelationship, a value of a gradient or slope of the interrelationship, a distance between peaks of the interrelationship, a distance between valleys of the interrelationship, a distance between a peak and a valley of the interrelationship, or a shape of the interrelationship.

Figure 15:
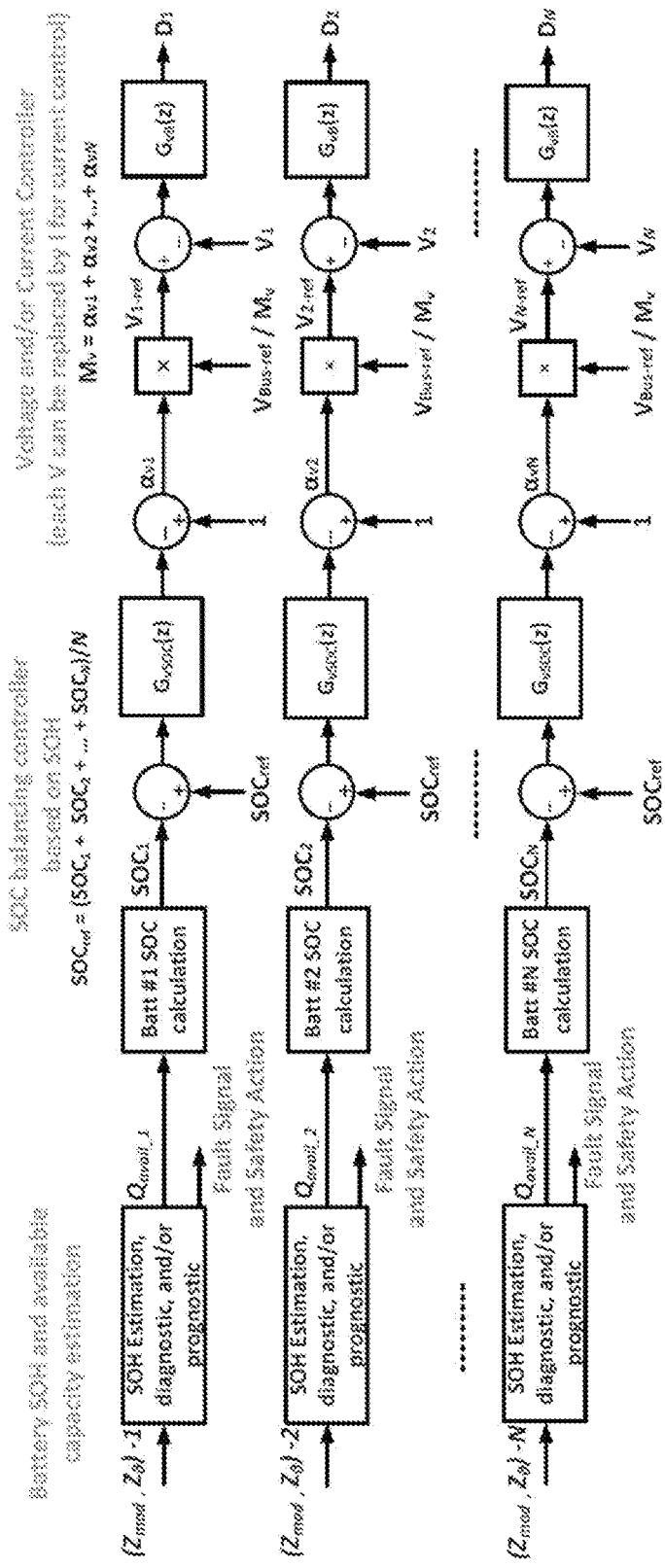
FIG. 15 is a SOC control diagram for an energy system that is configured to use SOH and SOC according to an implementation described herein.

Referring now to FIG. 15, a block diagram illustrating an example voltage and/or current controller for an energy storage system is shown. The system of FIG. 15 includes a plurality of energy storage devices (e.g., batteries). Although three batteries are shown in FIG. 15, it should be understood that the system can include more or less than three batteries. Additionally, although the energy storage devices shown in FIG. 15 are batteries, it should be understood that batteries are only provided as example energy storage devices. The SOH estimated as described herein (e.g., by the model 100 in FIG. 1) can be used to perform system control and/or safety actions. For example, in FIG. 15, $D_1$-$D_N$ represent the control signals that control the charge/discharge rates of each battery in the system and/or control other actions. It should be understood that control actions are based, in part, on the individual and relative SOHs of each of the batteries in the system. Additionally, fast fault signals ("Fault Signal and Safety Action") are shown in FIG. 15. Battery failure can be detected based on the interrelationship between magnitude and phase of the complex impedance spectrum (or the SOH indicators or signatures described herein) of each battery using the methods described herein within a duration (e.g., millisecond or second time scales) that is much less than a charge/discharge cycle (e.g. hours or days). Optionally, this can be performed during battery operation with online real-time impedance measurements. There is therefore no need to capture and analyze data for complete charge and discharge cycles. In other words, real-time measurement of the complex impedance spectrum can be used to predict SOH using the SOH indicators or signatures obtained from the interrelationship between phase and magnitude and/or the phase-magnitude plot. As described herein, the SOH indicators or signatures or features that are based on the phase-magnitude interrelationship include, but are not limited to, extrema values, local maximum values, local minimum values, the number of local maximum or peak values (for example within a frequency range), the number of local minimum or valley values (for example within a frequency range), the shift amount and variations in peak values, the shift amount and variations in minimum or valley values, and/or the slope/rate of change when moving from a peak value to a valley value or when moving from a valley value to a peak value.

FIG. 15 is a SOC control diagram for an energy system that is configured to use SOH and SOC. As described above, SOH is determined from the interrelationship between the magnitude and the phase of the complex impedance of the energy storage device. Based on the input value of ($Z_{mod}$, $Z_\theta$) of each battery cell, the SOH estimator, which analyzes the interrelationship between magnitude and the phase of the complex impedance spectrum, outputs the estimated available capacity $Q_{avail}$ to calculate or correct SOC value of each battery cell or battery module. The SOC value for each battery cell is calculated as given by the following equation:

$$SOC = \frac{Q_{avail} - \sum I_{batt} \Delta t}{Q_{nominal}} \quad (1)$$

where $Q_{avail}$ is the estimated available capacity of the battery cell or battery module, $I_{batt}$ is the current of the battery cell, and $\Delta t$ is the time interval during which the battery cell current is equal to $I_{batt}$. Because of the ANN-based capacity estimation functionality, the relatively healthier battery cell has larger $Q_{avail}$ than the $Q_{avail}$ of the relatively unhealthy (or less healthy) battery cell. When the capacity estimation information/result is fed into the SOC balancing controller, it creates a difference among the values of SOC of battery cells to compensate the ageing or health status differences of battery cells (refer to FIG. 15). As a result, the SOC value of a relatively less healthy battery decreases. This makes the system draw less energy from the less healthy battery because of the mechanism of the designed SOC balancing controller, which is discussed next.

The reference value for the SOC balancing controller (FIG. 15), i.e., $SOC_{ref}$, is calculated as (2) shows:

$$SOC_{ref} = \frac{(SOC_1 + SOC_2 + \ldots + SOC_i + \ldots + SOC_N)}{N} \quad (2)$$

where $SOC_i$ is the SOC value of ith battery cell, and N is the number of batteries in the system. The output of SOC balancing controller is the voltage multiplier $\alpha_{vi}$ (I=1, 2, ..., N) for each BPU. The value of $\alpha_{vi}$ is calculated based on the following equation:

$$\alpha_{vi} = 1 - (SOC_{ref} - SOC_i) \times G_{vSOC}(z) \quad (3)$$

where $G_{vSOC}(z)$ is the digital or discrete SOC balancing proportional-integral (PI) compensator/controller of the SOC control loop as given by the following equation:

$$G_{vSOC}(z) = K_{P-SOC} + \frac{K_{I-SOC} \times z}{z - 1} \quad (4)$$

where $K_{P-SOC}$ and $K_{I-SOC}$ are the parameters of SOC balancing PI compensator.

The voltage multiplier $\alpha_{vi}$ is used to decide the output voltage reference value of dc-dc converter connected with each battery cell, and the output voltage reference value $V_{i-ref}$ (i=1, 2, ..., N) is calculated as (5) shows:

$$V_{i-ref} = \frac{\alpha_{vi}}{M_v} \times V_{Bus-ref} = \frac{\alpha_{vi}}{\alpha_{v1} + \alpha_{v2} + \ldots + \alpha_{vN}} \times V_{Bus-ref} \quad (5)$$

where $V_{Bus-ref}$ is the reference value of bus voltage and $M_v$ is the sum of all the voltage multiplier values as given by the following equation:

$$M_v = \alpha_{v1} + \alpha_{v2} + \ldots + \alpha_{vN}. \quad (6)$$

Because the outputs of the dc-dc converters are connected in series in the example of FIG. 15, the power drawn by load, i.e., $P_{bus}$, can be calculated as (7) shows:

$$P_{bus} = \sum_{i=1}^{N} p_i = \sum_{i=1}^{N} I_{bus} V_i \quad (7)$$

where $p_i$ is the output power of the ith BPU, $I_{bus}$ is the bus current, and $V_i$ is the output voltage of ith BPU or dc-dc converter. Then the power from the ith battery, i.e., $P_{batt-i}$, can be calculated as (8) shows:

$$P_{batt-i} = \frac{P_i}{\eta_i} = \frac{I_{bus} V_i}{\eta_i} = \frac{I_{bus}}{\eta_i} \times V_{i-ref} = k \times V_{i-ref} \quad (8)$$

where $\eta_i$ is the efficiency of the ith dc-dc power converter. The efficiency values of the dc-dc converters are assumed to be equal in this example, i.e., every dc-dc converter is assumed to be identical, and the output voltage $V_i$ is regulated to be equal to the reference value $V_{i-ref}$ by the output voltage controller. Then based on (8), it can be noted that the higher the output voltage reference value is, i.e., $V_{i\text{-}ref}$, the higher the power drawn from a battery cell, i.e., $P_{batt\text{-}i}$, will be (the value of k here is a constant).

The duty cycle $D_i$ of ith dc-dc converter is calculated as (9) shows:

$$D_i = (V_{i\text{-}ref} - V_i) \times G_{vB}(z) \tag{9}$$

where $G_{vB}(z)$ is the digital or discrete dc-dc converter output voltage PI compensator/controller as given by the following equation:

$$G_{vB}(z) = K_{P\text{-}vB} + \frac{K_{I\text{-}vB} \times z}{z - 1} \tag{10}$$

where $K_{P\text{-}vB}$ and $K_{I\text{-}vB}$ are the parameters of output voltage PI compensator. In the experimental work of this article, the used values for $K_{P\text{-}vB}$ and $K_{I\text{-}vB}$ are equal to 4.95 and 0.1, respectively, and the output voltage is sampled at $f_{vB}=1/T_{vB}=1$ M sample/second (i.e., $T_{vB}=1$ µs).

Based on the above analysis, the SOC value of a relatively unhealthy or less healthy battery cell decreases when the SOH estimation is activated in the system. Therefore, the SOC balancing controller outputs a smaller voltage multiplier for this corresponding less healthy battery cell. This causes the output voltage reference value for the dc-dc converter connected with this less healthy battery cell to decrease. Since all of the dc-dc converter outputs are connected in series and therefore carry the same output current, this results in less energy drawn from the less healthy battery cell, or more energy drawn from relatively healthier battery cell, in order for all of the battery cells to reach their end of discharge at the same time.

The SOC balancing controller sets the discharge rate for a given battery cell based on its relative health compared to the other battery cells (and not the absolute value of its health), which yields a more accurate health-aware SOC balancing performance.

The methods described herein result in accurate, fast, and efficient SOH estimation.

Figure 16:
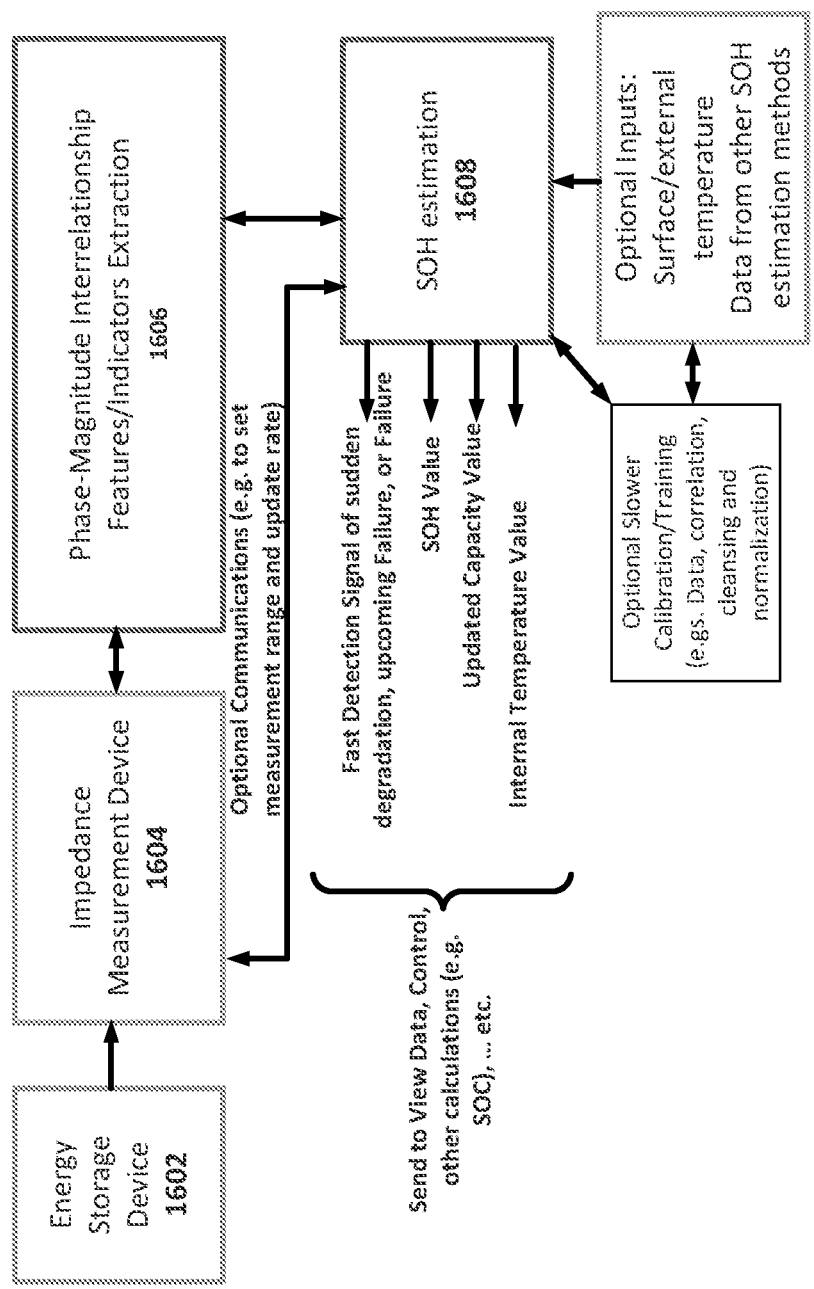
FIG. 16 is a block diagram illustrating a process for using the phase-magnitude interrelationship of an energy storage device according to implementations described herein.

Referring now to FIG. 16, a block diagram illustrating a process for using the phase-magnitude interrelationship according to implementations described herein is shown. The energy storage device 1602 is shown in FIG. 16. Optionally, the energy storage device 1602 is a lithium ion battery. This disclosure contemplates that the energy storage device 1602 may be a battery, supercapacitor, electrochemical device, biosensor, or proximity sensor. The magnitude and phase of voltage and current of the energy storage device 1602 are measured. This can be accomplished, for example, using an impedance measurement device 1604 such as an electrochemical impedance analyzer or by using an electronic circuit that performs variable frequency perturbation to obtain the response of the voltage and current in order to obtain or calculate the impedance values at different frequency values. The electrochemical impedance analyzer and electronic circuit discussed above are well known in the art and therefore not described in further detail herein. It should be understood that these complex impedance measurements can be used to obtain the phase-magnitude interrelationship of the complex impedance spectrum of the energy storage device 1604. Optionally, the phase-magnitude interrelationship can be plotted (see e.g., FIGS. 4-8).

Thereafter, one or more features of the interrelationship between magnitude and phase of the complex impedance spectrum of the energy storage device can be extracted at 1606. Such features include, but are not limited to, a peak value of the interrelationship, a valley value of the interrelationship, a peak-to-valley value of the interrelationship, a number or location of peaks of the interrelationship, a number or location of valleys of the interrelationship, a value of a gradient or slope of the interrelationship, a distance between peaks of the interrelationship, a distance between valleys of the interrelationship, a distance between a peak and a valley of the interrelationship, or a shape of the interrelationship. Additionally, a SOH of the energy storage device 1602 can then be estimated at 1608 based on the extracted features according to the techniques described herein. For example, the SOH can optionally be estimated at 1608 using a machine learning model as described herein. Additionally, as described herein, this disclosure contemplates updating capacity values for the energy storage device, estimating internal temperatures for the energy storage device, and/or providing alarms indicative of sudden degradation or failure of the energy storage device.

It should be appreciated that the logical operations described herein with respect to the various figures may be implemented (1) as a sequence of computer implemented acts or program modules (i.e., software) running on a computing device (e.g., the computing device described in FIG. 3), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 3:
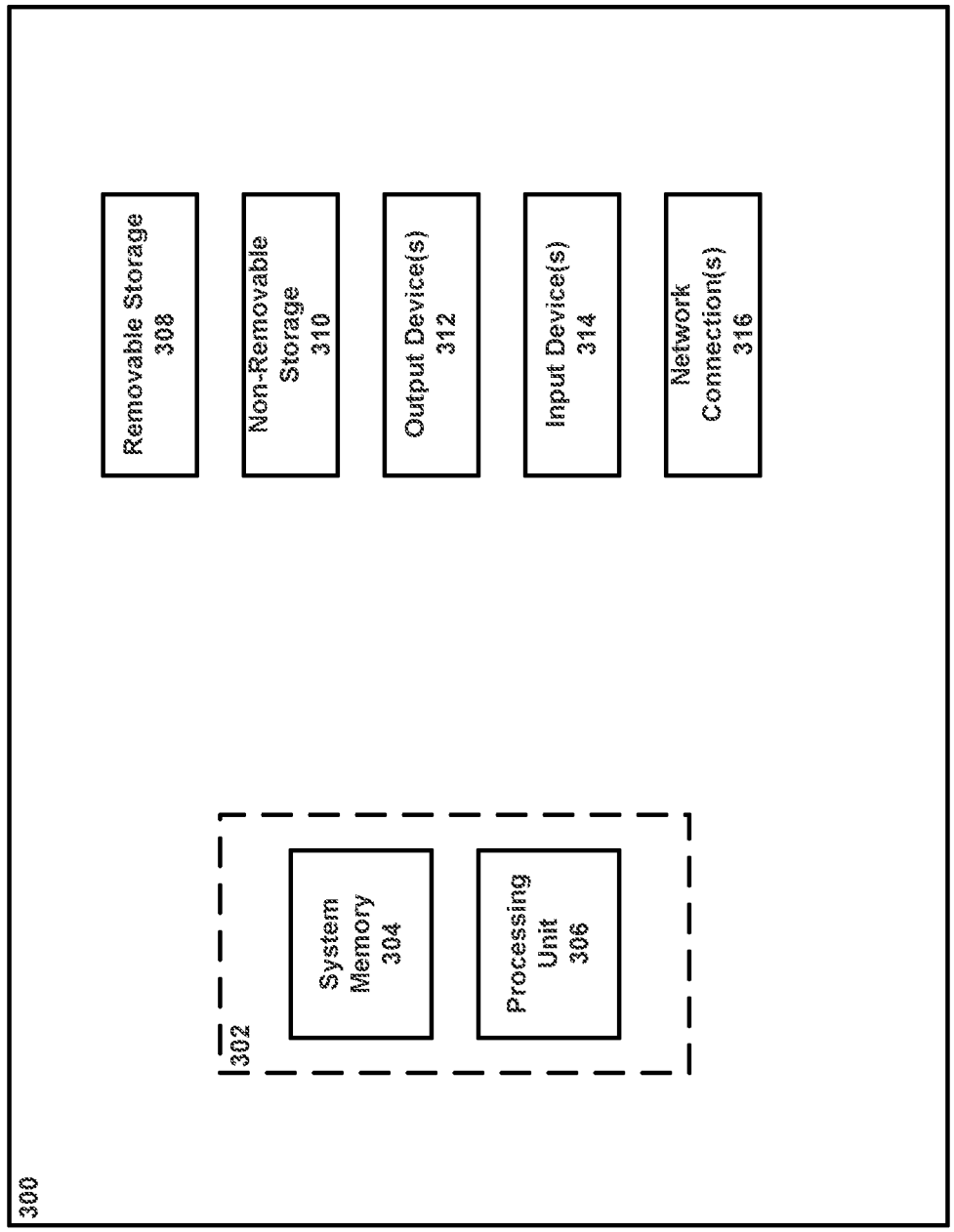
FIG. 3 is an example computing device.

Referring to FIG. 3, an example computing device 300 upon which the methods described herein may be implemented is illustrated. It should be understood that the example computing device 300 is only one example of a suitable computing environment upon which the methods described herein may be implemented. Optionally, the computing device 300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 300 typically includes at least one processing unit 306 and system memory 304. Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 3 by dashed line 302. The processing unit 306 may be a standard programmable processor that performs arithmetic and logic operations necessary for operation of the computing device 300. The computing device 300 may also include a bus or other communication mechanism for communicating information among various components of the computing device 300.

Computing device 300 may have additional features/functionality. For example, computing device 300 may include additional storage such as removable storage 308 and non-removable storage 310 including, but not limited to, magnetic or optical disks or tapes. Computing device 300 may also contain network connection(s) 316 that allow the device to communicate with other devices. Computing device 300 may also have input device(s) 314 such as a keyboard, mouse, touch screen, etc. Output device(s) 312 such as a display, speakers, printer, etc. may also be included. The additional devices may be connected to the bus in order to facilitate communication of data among the components of the computing device 300. All these devices are well known in the art and need not be discussed at length here.

The processing unit 306 may be configured to execute program code encoded in tangible, computer-readable media. Tangible, computer-readable media refers to any media that is capable of providing data that causes the computing device 300 (i.e., a machine) to operate in a particular fashion. Various computer-readable media may be utilized to provide instructions to the processing unit 306 for execution. Example tangible, computer-readable media may include, but is not limited to, volatile media, non-volatile media, removable media and non-removable media implemented in any method or technology for storage of information such as computer readable instructions, data structures, program modules or other data. System memory 304, removable storage 308, and non-removable storage 310 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 306 may execute program code stored in the system memory 304. For example, the bus may carry data to the system memory 304, from which the processing unit 306 receives and executes instructions. The data received by the system memory 304 may optionally be stored on the removable storage 308 or the non-removable storage 310 before or after execution by the processing unit 306.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for determining State-of-Health (SOH) for energy storage devices, comprising:

measuring a complex impedance of an energy storage device for a range of frequency; and estimating a state of health (SOH) of the energy storage device based on an interrelationship between a magnitude and a phase of the complex impedance of the energy storage device, wherein:

a change in a gradient or slope of the interrelationship indicates that a degradation in SOH of the energy storage device is a permanent degradation in SOH, a change in a distance between a peak and a valley of the interrelationship without a change in a peak-to-valley value of the interrelationship indicates that the degradation in SOH of the energy storage device is a permanent degradation in SOH, a change in a distance between a peak and a valley of the interrelationship in combination with a change in a peak-to-valley value of the interrelationship indicates that the degradation in SOH of the energy storage device is a temporary degradation in SOH, and/or a change in a peak-to-valley value of the interrelationship indicates a change in internal temperature of the energy storage device.

2. The method of claim 1, wherein the SOH of the energy storage device is estimated based on one or more features of the interrelationship between the magnitude and the phase of the complex impedance of the energy storage device, the one or more features of the interrelationship comprising a peak value of the interrelationship, a valley value of the interrelationship, a peak-to-valley value of the interrelationship, a number or location of peaks of the interrelationship, a number or location of valleys of the interrelationship, a value of a gradient or slope of the interrelationship, a distance between peaks of the interrelationship, a distance between valleys of the interrelationship, a distance between a peak and a valley of the interrelationship, or a shape of the interrelationship.

3. The method of claim 2, wherein estimating the SOH of the energy storage device based on the interrelationship between the magnitude and the phase of the complex impedance of the energy storage device comprises:
- extracting the one or more features from the interrelationship between the magnitude and the phase of the complex impedance of the energy storage device;
- inputting the one or more extracted features into a machine learning model; and
- predicting, using the machine learning model, the SOH of the energy storage device.

4. The method of claim 3, further comprising inputting a plurality of data points from the interrelationship between the magnitude and the phase of the complex impedance of the energy storage device into the machine learning model, wherein the SOH of the energy storage device is predicted based on the one or more extracted features and the plurality of data points.

5. The method of claim 2, further comprising:
- extracting the one or more features from the interrelationship between the magnitude and the phase of the complex impedance of the energy storage device;
- inputting the one or more extracted features into a machine learning model; and
- predicting, using the machine learning model, a fault or failure of the energy storage device.

6. The method of claim 1, further comprising generating a phase-magnitude plot of the complex impedance of the energy storage device, wherein the phase-magnitude plot is a graphical representation of the interrelationship between the magnitude and the phase of the complex impedance of the energy storage device.

7. The method of claim 6, wherein the SOH of the energy storage device is estimated based on one or more features of the phase-magnitude plot, the one or more features of the phase-magnitude plot comprising a peak value of the phase-magnitude plot, a valley value of the phase-magnitude plot, a peak-to-valley value of the phase-magnitude plot, a number or location of peaks of the phase-magnitude plot, a number or location of valleys of the phase-magnitude plot, a value of a gradient or slope of the phase-magnitude plot, a distance between peaks of the phase-magnitude plot, a distance between valleys of the phase-magnitude plot, a distance between a peak and a valley of the phase-magnitude plot, or a shape of the phase-magnitude plot.

8. The method of claim 1, further comprising providing a warning or fault message based on the SOH of the energy storage device.

9. The method of claim 1, wherein estimating the SOH of the energy storage device based on the interrelationship between the magnitude and the phase of the complex impedance of the energy storage device comprises:
- inputting a plurality of data points from the interrelationship between the magnitude and the phase of the complex impedance of the energy storage device into a machine learning model; and
- predicting, using the machine learning model, the SOH of the energy storage device.

10. The method of claim 9, wherein the machine learning model is a supervised learning model, a semi-supervised learning model, or an unsupervised learning model.

11. The method of claim 1, further comprising:
- inputting a plurality of data points from the interrelationship between the magnitude and the phase of the complex impedance of the energy storage device into a machine learning model; and
- predicting, using the machine learning model, a fault or failure of the energy storage device.

12. The method of claim 1, further comprising estimating a capacity of the energy storage device based on the SOH of the energy storage device.

13. The method of claim 12, further comprising adjusting a state of charge (SOC) of the energy storage device based on the capacity of the energy storage device.

14. The method of claim 1, wherein the energy storage device is a battery, a supercapacitor, an electrochemical device, a biosensor, or a proximity sensor.

15. A system for determining State-of-Health (SOH) of energy storage devices, comprising:
- an energy storage device;
- a machine learning module that is configured to predict a state of health (SOH) of the energy storage device; and
- a computing device comprising a processor and a memory, the memory having computer-executable instructions stored thereon that, when executed by the processor, cause the processor to:
  - receive a complex impedance of the energy storage device for a range of frequency;
  - input an interrelationship between a magnitude and a phase of the complex impedance of the energy storage device into the machine learning module; and
  - receive an output predicted by the machine learning module, wherein the output is the SOH of the energy storage device, wherein:
    - a change in a gradient or slope of the interrelationship indicates that a degradation in SOH of the energy storage device is a permanent degradation in SOH,
    - a change in a distance between a peak and a valley of the interrelationship without a change in a peak-to-valley value of the interrelationship indicates that the degradation in SOH of the energy storage device is a permanent degradation in SOH,
    - a change in a distance between a peak and a valley of the interrelationship in combination with a change in a peak-to-valley value of the interrelationship indicates that the degradation in SOH of the energy storage device is a temporary degradation in SOH, and/or
    - a change in a peak-to-valley value of the interrelationship indicates a change in internal temperature of the energy storage device.

* * * * *